US012641114B2

(12) United States Patent
Shete et al.

(10) Patent No.: US 12,641,114 B2
(45) Date of Patent: May 26, 2026

(54) SYSTEMS AND METHODS FOR VISUALIZING SECURITY COVERAGE BASED ON MITRE ATT AND CK FRAMEWORK

(71) Applicant: Zscaler, Inc., San Jose, CA (US)

(72) Inventors: Shriyash Shete, Bloomington, IN (US); Raj Krishna, San Francisco, CA (US); Jithin Prajeev Nair, San Jose, CA (US); Valentin Khechinashvili, Alamo, CA (US); Sundar Rajkumar Jothimani, San Jose, CA (US); Arjav Vakharia, Dallas, TX (US); Karthikeyan Thamilarasu, Cumming, GA (US); Christopher Young, Brossard (CA)

(73) Assignee: Zscaler, Inc., San Jose, CA (US)

( * ) Notice: Subject to any disclaimer, the term of this patent is extended or adjusted under 35 U.S.C. 154(b) by 105 days.

(21) Appl. No.: 18/443,631

(22) Filed: Feb. 16, 2024

(65) Prior Publication Data

US 2025/0193228 A1     Jun. 12, 2025

Related U.S. Application Data

(60) Provisional application No. 63/608,405, filed on Dec. 11, 2023.

(51) Int. Cl.
| | |
|---|---|
| *H04L 9/40* | (2022.01) |
| *G06F 16/28* | (2019.01) |
| *H04L 9/08* | (2006.01) |

(52) U.S. Cl.
CPC .......... *H04L 63/1441* (2013.01); *H04L 63/20* (2013.01); *G06F 16/283* (2019.01); *H04L 9/0825* (2013.01)

(58) Field of Classification Search
CPC .... H04L 63/20; H04L 90/0825; H04L 9/0825
See application file for complete search history.

(56) References Cited

U.S. PATENT DOCUMENTS

| | | | | |
|---|---|---|---|---|
| 9,152,789 | B2 | 10/2015 | Natarajan et al. | |
| 9,609,015 | B2 | 3/2017 | Natarajan et al. | |
| 11,757,907 | B1 * | 9/2023 | Berger | G06N 7/01 726/23 |
| 2021/0248534 | A1 * | 8/2021 | Ares | G06F 16/283 |
| 2022/0046038 | A1 | 2/2022 | Sinha et al. | |
| 2022/0345483 | A1 * | 10/2022 | Shua | H04L 9/0825 |
| 2023/0283521 | A1 * | 9/2023 | Berger | H04L 63/20 709/223 |
| 2024/0340301 | A1 * | 10/2024 | Thompson | H04L 63/20 |

* cited by examiner

*Primary Examiner* — Barbara B Anyan
(74) *Attorney, Agent, or Firm* — Baratta Law PLLC; Lawrence A. Baratta, Jr.; Ryan Odessa

(57) ABSTRACT

Systems and methods for visualizing security coverage based on MITRE ATT&CK framework include obtaining cybersecurity monitoring data for an organization where the cybersecurity monitoring data is from a plurality of sources including from cybersecurity monitoring of a cloud environment associated with the organization; providing an interactive User Interface (UI), wherein the UI overlays a catalog of known malicious tactics with the cybersecurity monitoring data; and responsive to one or more selections within the UI, providing information related to coverage of one or more threat techniques.

9 Claims, 22 Drawing Sheets

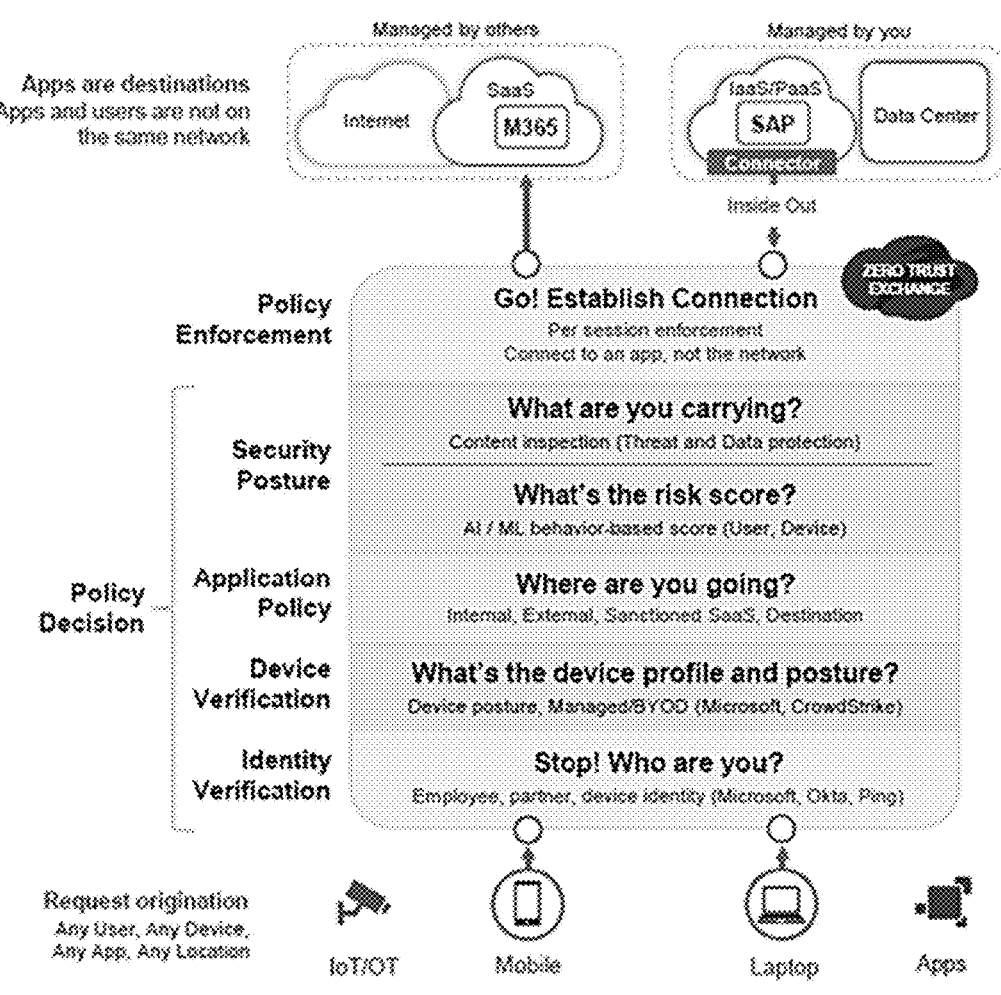
Comparing Zero Trust with a network firewall architecture

340

ANALYZE A NETWORK TO MEASURE SECURITY PARAMETERS ASSOCIATED WITH THE USE OF ONE OR MORE NETWORK SECURITY TOOLS THAT ARE CONFIGURED FOR MITIGATING RISK WITH RESPECT TO NETWORK COMPROMISE, LATERAL MOVEMENT, DATA LOSS, AND ASSET EXPOSURE
342

BASED ON THE MEASURED SECURITY PARAMETERS, QUANTIFY THE ONE OR MORE NETWORK SECURITY TOOLS TO DETERMINE AN EFFECTIVENESS SCORE DEFINING AN ABILITY OF THE ONE OR MORE NETWORK SECURITY TOOLS, IN COMBINATION, TO COUNTERACT THE NEWORK COMPROMISE, LATERAL MOVEMENT, DATA LOSS, AND ASSET EXPOSURE
344

FIG. 5

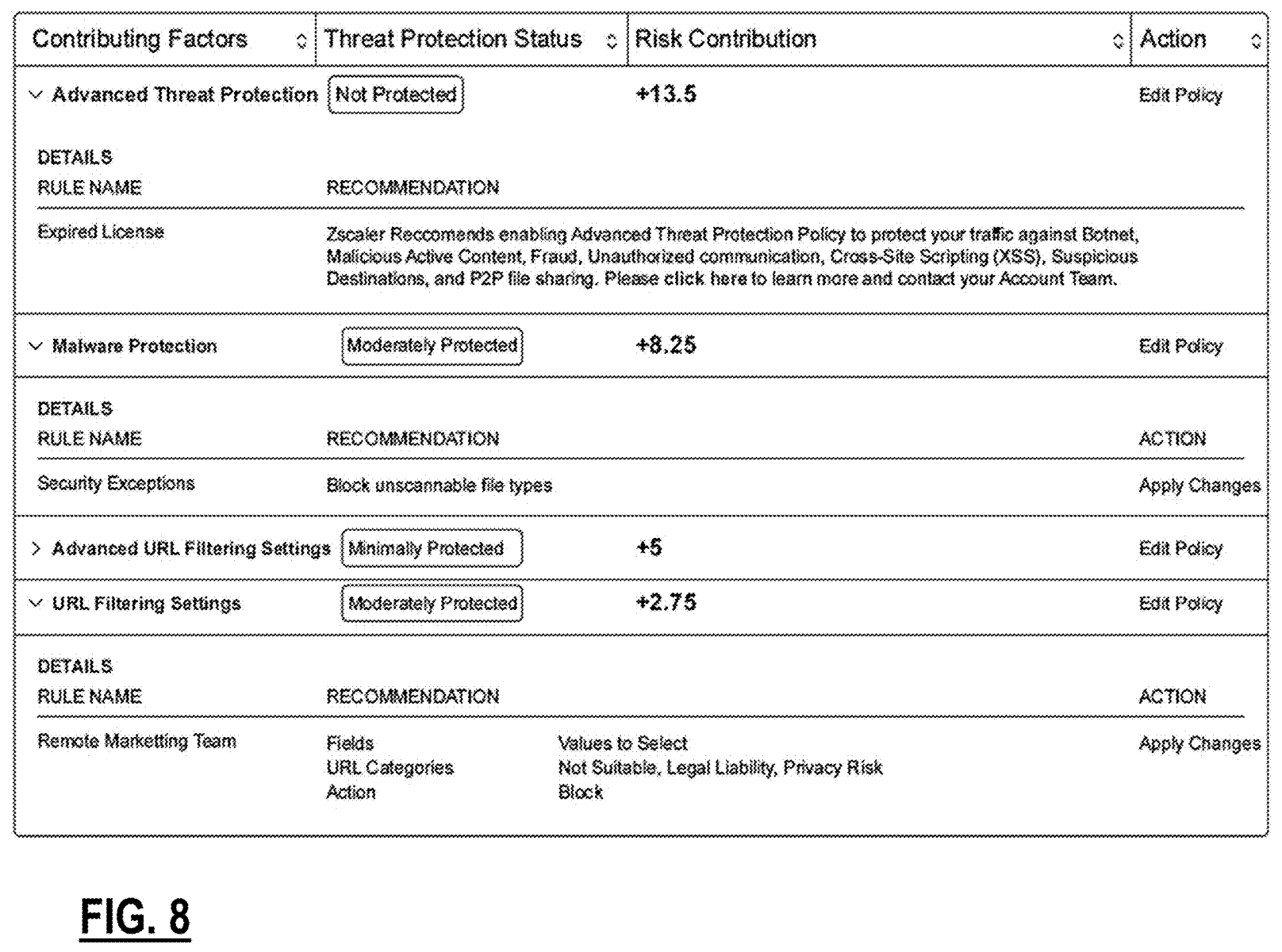

| Contributing Factors | Threat Protection Status | Risk Contribution | Action |
|---|---|---|---|
| ∨ Advanced Threat Protection | Not Protected | +13.5 | Edit Policy |

DETAILS

| RULE NAME | RECOMMENDATION |
|---|---|
| Expired License | Zscaler Reccomends enabling Advanced Threat Protection Policy to protect your traffic against Botnet, Malicious Active Content, Fraud, Unauthorized communication, Cross-Site Scripting (XSS), Suspicious Destinations, and P2P file sharing. Please click here to learn more and contact your Account Team. |

| | | | |
|---|---|---|---|
| ∨ Malware Protection | Moderately Protected | +8.25 | Edit Policy |

DETAILS

| RULE NAME | RECOMMENDATION | | ACTION |
|---|---|---|---|
| Security Exceptions | Block unscannable file types | | Apply Changes |

| | | | |
|---|---|---|---|
| > Advanced URL Filtering Settings | Minimally Protected | +5 | Edit Policy |
| ∨ URL Filtering Settings | Moderately Protected | +2.75 | Edit Policy |

DETAILS

| RULE NAME | RECOMMENDATION | | ACTION |
|---|---|---|---|
| Remote Marketting Team | Fields: URL Categories, Action | Values to Select: Not Suitable, Legal Liability, Privacy Risk, Block | Apply Changes |

FIG. 8

> Browser Control Settings     [ MinimallyProtected ]     +2.25     Edit Policy

DETAILS

| RULE NAME | RECOMMENDATION | ACTION |
|---|---|---|
| Browser Blocking - Chrome | Block older Chrome Versions | Apply Changes |
| Browser Blocking - Microsoft | Block internet Explorer Version: IE6, IE7, IE8, IE9, IE10 and older versions | Apply Changes |
| Browser Blocking - Opera | Block older Opera versions | Apply Changes |

> Advanced Settings     [ Protected ]

> Mobile Malware Protection     [ Protected ]

FIG. 9

Figure 10:
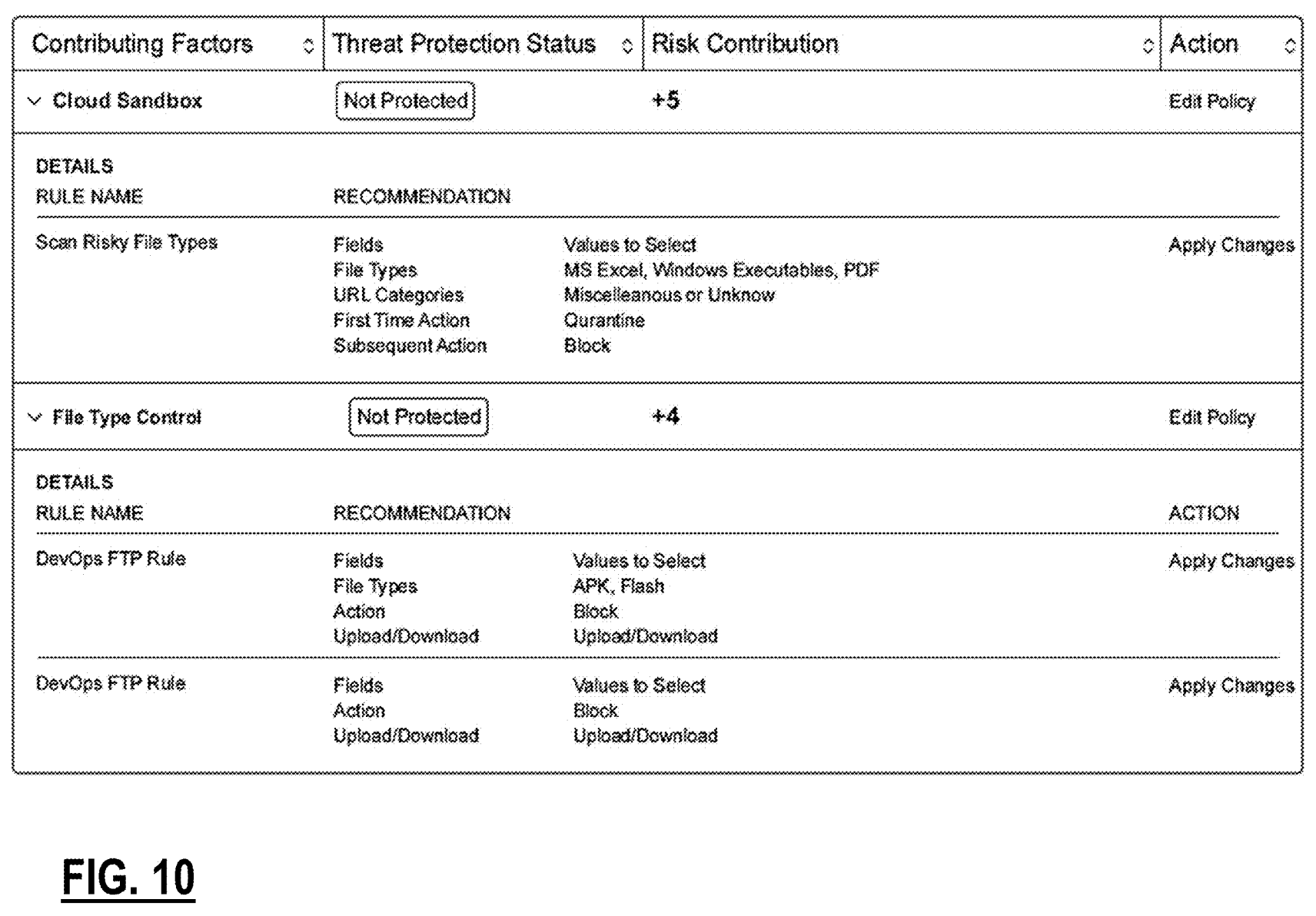

| Contributing Factors | ◇ | Threat Protection Status | ◇ | Risk Contribution | ◇ | Action | ◇ |
|---|---|---|---|---|---|---|---|
| ∨ Cloud Sandbox | | Not Protected | | +5 | | Edit Policy | |

DETAILS
RULE NAME

Scan Risky File Types     RECOMMENDATION        Apply Changes

| Fields | Values to Select |
|---|---|
| File Types | MS Excel, Windows Executables, PDF |
| URL Categories | Miscellaneous or Unknow |
| First Time Action | Quarantine |
| Subsequent Action | Block |

| ∨ File Type Control | | Not Protected | | +4 | | Edit Policy | |

DETAILS
RULE NAME                                    ACTION

DevOps FTP Rule     RECOMMENDATION        Apply Changes

| Fields | Values to Select |
|---|---|
| File Types | APK, Flash |
| Action | Block |
| Upload/Download | Upload/Download |

DevOps FTP Rule                                    Apply Changes

| Fields | Values to Select |
|---|---|
| Action | Block |
| Upload/Download | Upload/Download |

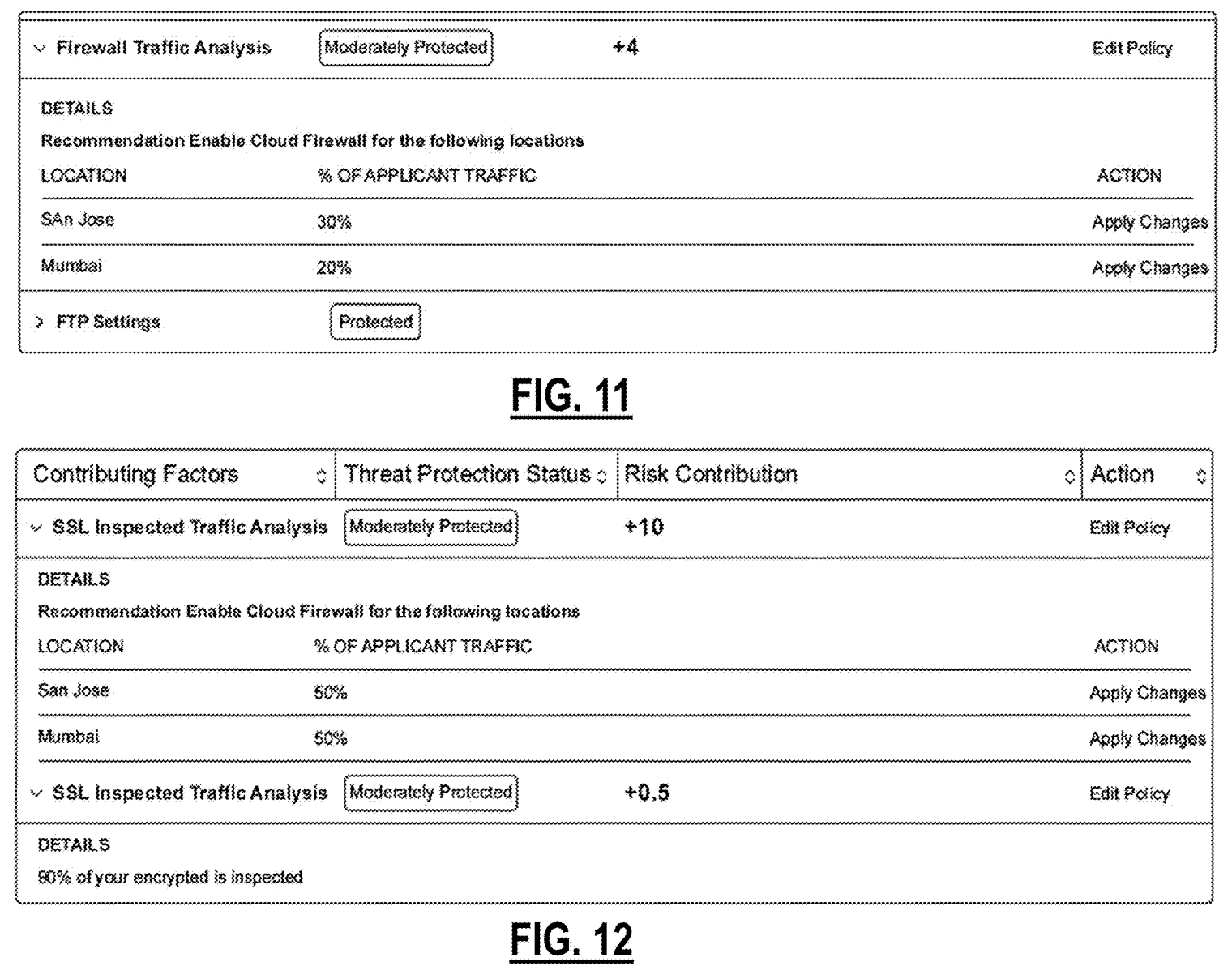

> Firewall Traffic Analysis     [Moderately Protected]     +4

DETAILS
Recommendation Enable Cloud Firewall for the following locations

| LOCATION | % OF APPLICANT TRAFFIC | ACTION |
|---|---|---|
| San Jose | 30% | Apply Changes |
| Mumbai | 20% | Apply Changes |

> FTP Settings     [Protected]

Edit Policy

FIG. 12

| Contributing Factors | Threat Protection Status | Risk Contribution | Action |
|---|---|---|---|
| > SSL Inspected Traffic Analysis | [Moderately Protected] | +10 | Edit Policy |

DETAILS
Recommendation Enable Cloud Firewall for the following locations

| LOCATION | % OF APPLICANT TRAFFIC | ACTION |
|---|---|---|
| San Jose | 50% | Apply Changes |
| Mumbai | 50% | Apply Changes |

> SSL Inspected Traffic Analysis     [Moderately Protected]     +0.5     Edit Policy DETAILS
90% of your encrypted is inspected

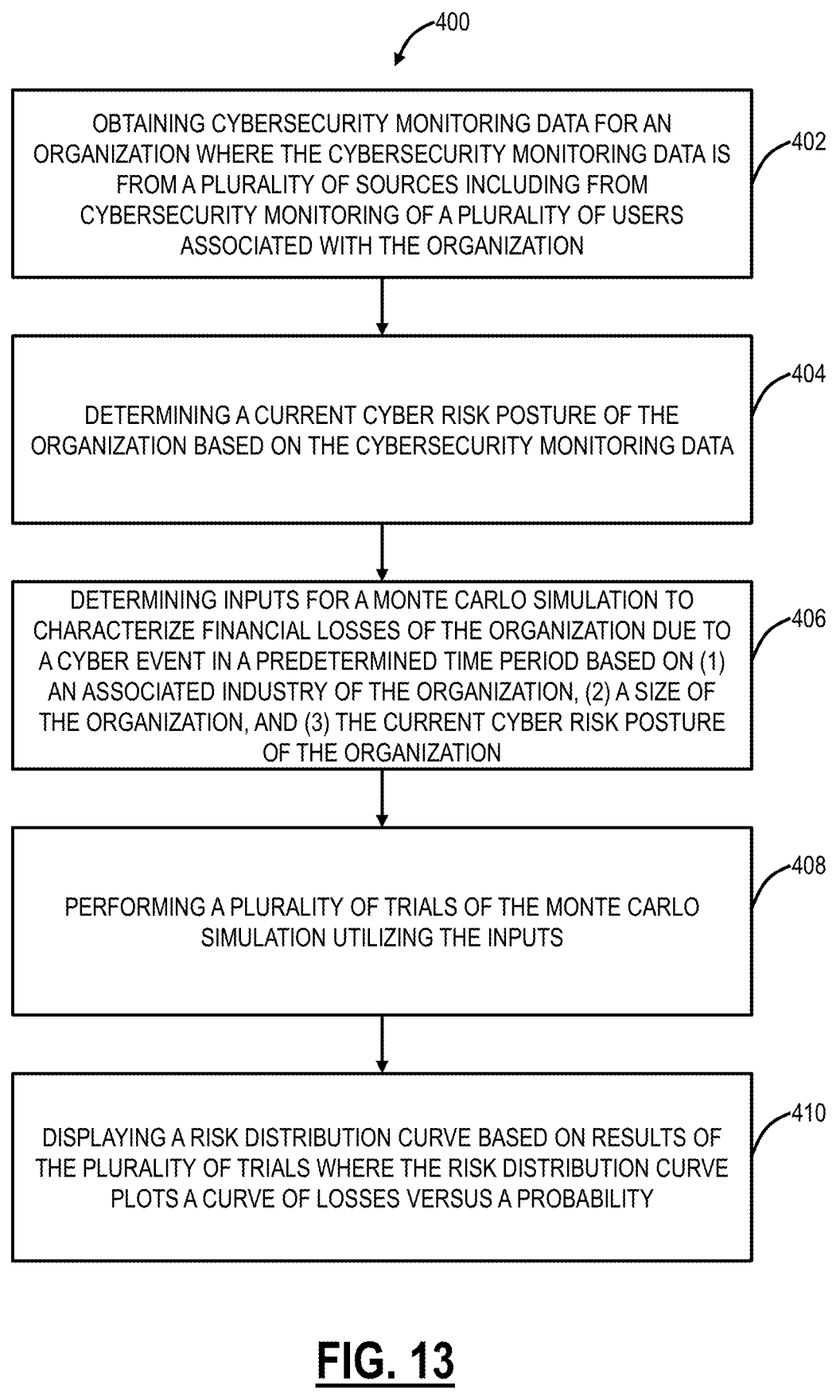

400

```
┌─────────────────────────────────────────────────┐
│  OBTAINING CYBERSECURITY MONITORING DATA FOR AN   │
│ ORGANIZATION WHERE THE CYBERSECURITY MONITORING   │ 402
│    DATA IS FROM A PLURALITY OF SOURCES INCLUDING  │
│       FROM CYBERSECURITY MONITORING OF A          │
│   PLURALITY OF USERS ASSOCIATED WITH THE          │
│              ORGANIZATION                          │
└─────────────────────────────────────────────────┘
```

OBTAINING CYBERSECURITY MONITORING DATA FOR AN ORGANIZATION WHERE THE CYBERSECURITY MONITORING DATA IS FROM A PLURALITY OF SOURCES INCLUDING FROM CYBERSECURITY MONITORING OF A PLURALITY OF USERS ASSOCIATED WITH THE ORGANIZATION — 402

DETERMINING A CURRENT CYBER RISK POSTURE OF THE ORGANIZATION BASED ON THE CYBERSECURITY MONITORING DATA — 404

DETERMINING INPUTS FOR A MONTE CARLO SIMULATION TO CHARACTERIZE FINANCIAL LOSSES OF THE ORGANIZATION DUE TO A CYBER EVENT IN A PREDETERMINED TIME PERIOD BASED ON (1) AN ASSOCIATED INDUSTRY OF THE ORGANIZATION, (2) A SIZE OF THE ORGANIZATION, AND (3) THE CURRENT CYBER RISK POSTURE OF THE ORGANIZATION — 406

PERFORMING A PLURALITY OF TRIALS OF THE MONTE CARLO SIMULATION UTILIZING THE INPUTS — 408

DISPLAYING A RISK DISTRIBUTION CURVE BASED ON RESULTS OF THE PLURALITY OF TRIALS WHERE THE RISK DISTRIBUTION CURVE PLOTS A CURVE OF LOSSES VERSUS A PROBABILITY — 410

FIG. 13

| ① Risk Name | ② Probability of a Loss Over 1 Year | ③ Lower Bound | Upper Bound | ④ Future Probability after Mitigation |
|---|---|---|---|---|
| Data Loss | 10.7% | $211,000 | $13,000,000 | 4.1% |
| External Attack Surface | 7.3% | $211,000 | $13,000,000 | 5.5% |
| Lateral Propagation | 15.2% | $211,000 | $13,000,000 | 2.1% |
| Prevent Compromise | 13.8% | $211,000 | $13,000,000 | 1.8% |

Note: Generic values for illustrative purposes only

Annual Business Risk Reduction benefit quantification

| Cyber Attack Threat Landscape Comparison | Incident Probability (%) | Potential Incident Impact ($) |
|---|---|---|
| 1. _Benchmark Risk Profile:_ Healthcare sector, $10B-$100B annual revenue | 18.1% | $0.21M - 13M |
| 2. _Current Risk Profile:_ Accounting for current state risk mitigation measures | 11.8% | $1.3M |
| 3. _Optimal Risk Profile:_ Accounting for future state risk mitigation based on Top 10 factor remediation | 3.4% | $0.4M |
| Delta of moving from current to future state | | ↓$0.9M |

Improved Risk Reduction of
71% with Zscaler

FIG. 16

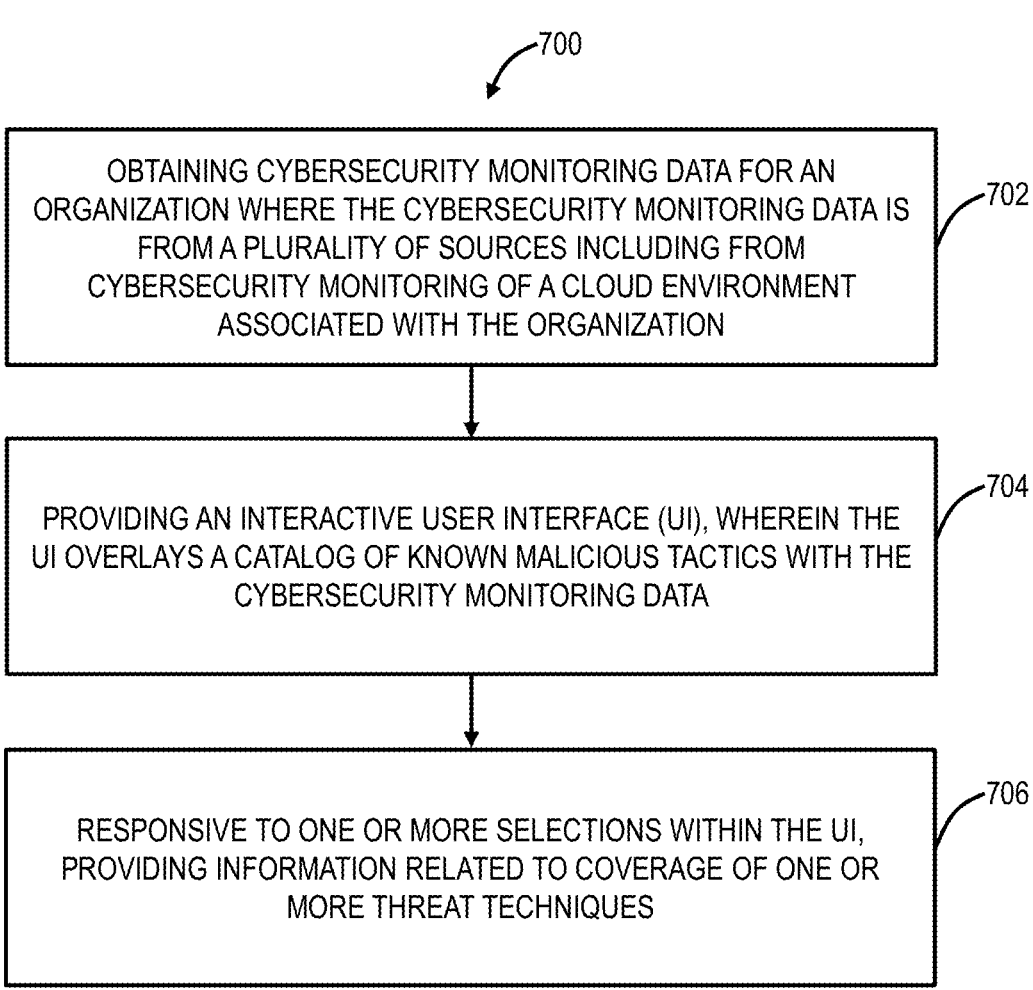

700

OBTAINING CYBERSECURITY MONITORING DATA FOR AN ORGANIZATION WHERE THE CYBERSECURITY MONITORING DATA IS FROM A PLURALITY OF SOURCES INCLUDING FROM CYBERSECURITY MONITORING OF A CLOUD ENVIRONMENT ASSOCIATED WITH THE ORGANIZATION

702

PROVIDING AN INTERACTIVE USER INTERFACE (UI), WHEREIN THE UI OVERLAYS A CATALOG OF KNOWN MALICIOUS TACTICS WITH THE CYBERSECURITY MONITORING DATA

704

RESPONSIVE TO ONE OR MORE SELECTIONS WITHIN THE UI, PROVIDING INFORMATION RELATED TO COVERAGE OF ONE OR MORE THREAT TECHNIQUES

SYSTEMS AND METHODS FOR VISUALIZING SECURITY COVERAGE BASED ON MITRE ATT AND CK FRAMEWORK

CROSS-REFERENCE TO RELATED APPLICATION(S)

The present disclosure claims priority to U.S. Provisional Patent Application 63/608,405, filed Dec. 11, 2023, entitled "Security Coverage User Interface based on MITRE ATT&CK framework," the contents of which are incorporated by reference in its entirety herein.

FIELD OF THE DISCLOSURE

The present disclosure generally relates to computer networking systems and methods, particularly focused on cybersecurity risk. More particularly, the present disclosure relates to systems and methods for visualizing security coverage based on MITRE ATT&CK framework.

BACKGROUND OF THE DISCLOSURE

At present, there is a challenge in measuring, quantifying, and remediating risk associated with cloud environments based on Information Technology (IT) resources and services. Determining what threats are covered by the various security services employed by an organization can be difficult when facing an entire cloud environment. Various well-known threat frameworks such as the MITRE ATT&CK framework and the NIST cybersecurity framework provide key insights into what tactics threat actors use to infiltrate organization environments. This wealth of information can be extremely valuable for Chief Information Security Officers (CISOs) when planning and maintaining their environments. The present disclosure provides systems and methods for visualizing an environment's security coverage based on these well-known threat frameworks.

BRIEF SUMMARY OF THE DISCLOSURE

In various embodiments, the present disclosure includes a method with steps, a cloud configured to implement the steps, and a non-transitory computer-readable medium storing computer-executable instructions for causing performance of the steps via the cloud. The steps include obtaining cybersecurity monitoring data for an organization where the cybersecurity monitoring data is from a plurality of sources including from cybersecurity monitoring of a cloud environment associated with the organization; providing an interactive User Interface (UI), wherein the UI overlays a catalog of known malicious tactics with the cybersecurity monitoring data; and responsive to one or more selections within the UI, providing information related to coverage of one or more threat techniques.

The steps can further include wherein the cybersecurity monitoring data includes license information associated with security services configured within the organizations cloud environment. The catalog of known malicious tactics can include MITRE Adversarial Tactics, Techniques, and Common Knowledge (ATT&CK) framework, wherein the cybersecurity monitoring data is overlayed thereon. The UI can be adapted to display a percentage of MITRE ATT&CK techniques which are covered within the organization's cloud environment. Each technique associated with the MITRE ATT&CK framework can be color coded based on whether it is covered by one or more security services. The color coding can be based on whether each technique is covered by a security service associated with the cloud, covered by a third party service, or not covered. Each technique associated with the MITRE ATT&CK framework can include a color coded indicator based on whether an associated security service is configured correctly. Each sub-technique associated with a technique can include a color coded indicator based on whether an associated security service is configured correctly. The information related to coverage of one or more threat techniques can include a remediation procedure for correcting a misconfigured security service associated with the one or more threat techniques. The catalog of known malicious tactics can include NIST cybersecurity framework, and wherein the cybersecurity monitoring data is overlayed thereon.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud in FIG. 1A and a comparison with the conventional firewall-based approach (appliance).

FIG. 5 is a flowchart of a process for determining the effectiveness of combination of security components for mitigating risk in a network.

FIGS. 7-12 are a series of screenshots of another user interface for displaying risk.

FIG. 13 is a flowchart of a process of financially modeling cyber risk.

FIG. 14 is a graph of a risk distribution curve.

FIG. 16 is a table illustrating risk reduction quantification.

FIG. 23 is a flowchart of a process for visualizing MITRE-based security coverage.

DETAILED DESCRIPTION OF THE DISCLOSURE

Again, the present disclosure relates to systems and methods for visualizing security coverage based on MITRE ATT&CK framework. The present disclosure aims to provide Chief Information Security Officers (CISOs) with a holistic framework for security risk quantification and measurement to defend their environments against cyberattacks. As described, the present systems provide an assessment of security configurations contributing to various risk scores of the organization. Because new and complex attacks are continuously created, organizations can struggle to understand how attackers operate. Because of this, it is increasingly difficult for organizations to achieve their security objectives. Even further, it can be difficult to understand what existing defenses can cover as a whole, and what future investments are needed to prevent attacks. That is, it is difficult to completely understand what the security solutions currently operated by organizations actually cover, i.e., to understand what the various security services described herein by the cloud 120 actually cover when they are executed in customer IT environments.

§ 1.0 Cybersecurity Monitoring and Protection Examples

Figure 1A:
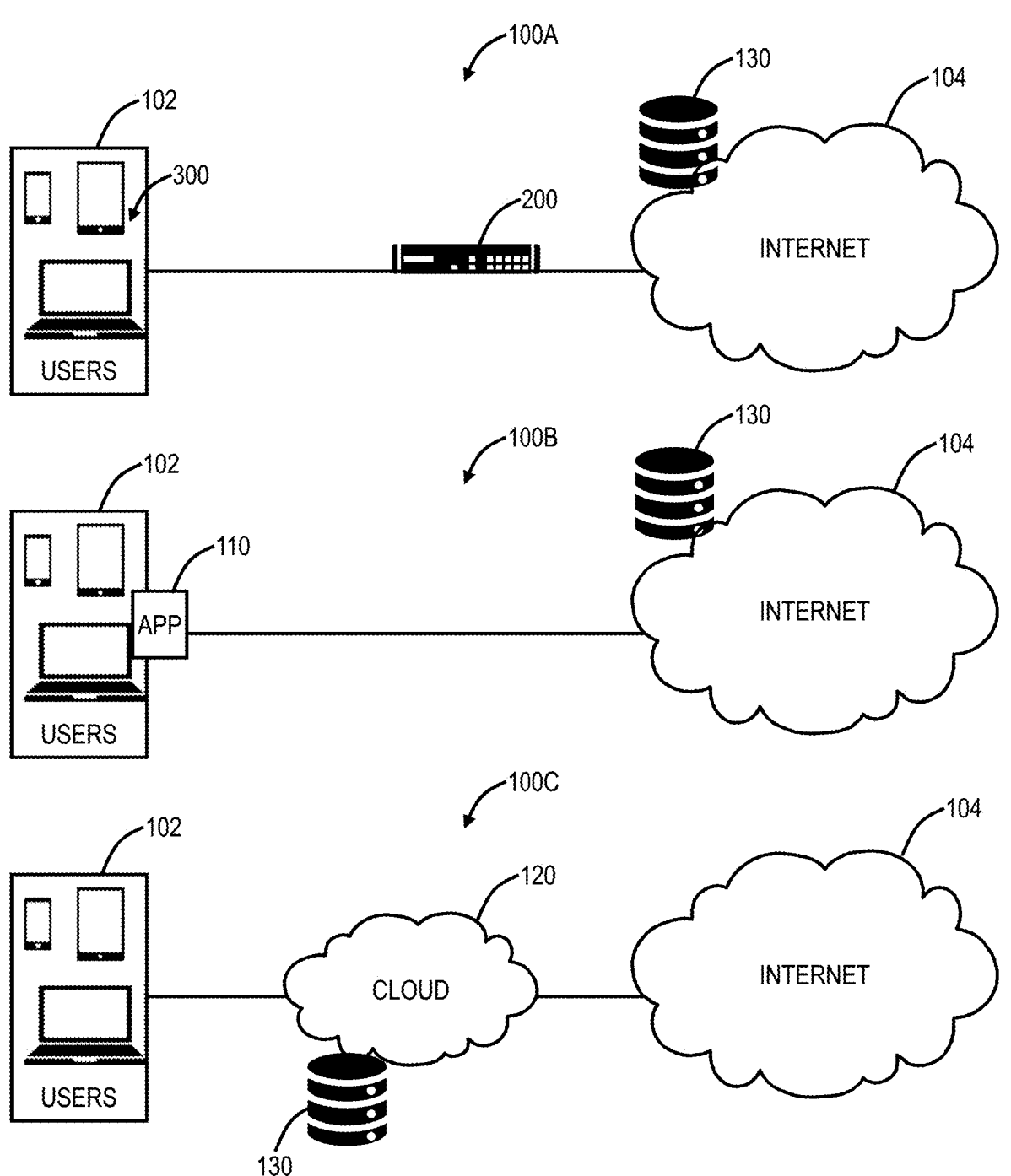
FIG. 1A is a network diagram of three example network configurations of cybersecurity monitoring of a user.
Figures 2, 3:
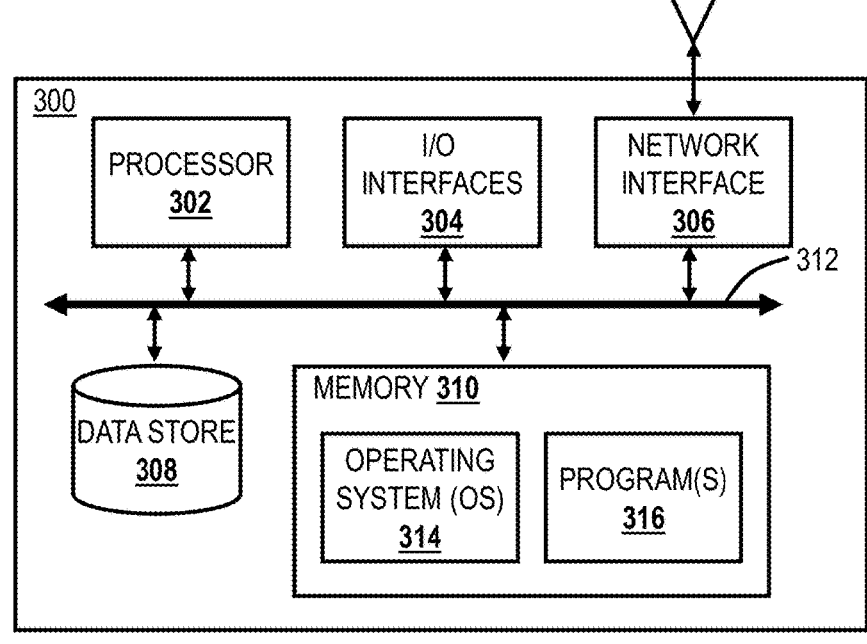
FIG. 2 is a block diagram of a server.
FIG. 3 is a block diagram of a user device.

FIG. 1A is a network diagram of three example network configurations 100A, 100B, 100C of cybersecurity monitoring and protection of a user 102. Those skilled in the art will recognize these are some examples for illustration purposes, there may be other approaches to cybersecurity monitoring, and these various approaches can be used in combination with one another as well as individually. Also, while shown for a single user 102, practical embodiments will handle a large volume of users 102, including multi-tenancy. In this example, the user 102 (having a user device 300 such as illustrated in FIG. 3) communicates on the Internet 104, including accessing cloud services, Software-as-a-Service, etc. (each may be offered via compute resources, such as using one or more servers 200 as illustrated in FIG. 2). As part of offering cybersecurity through these example network configurations 100A, 100B, 100C, there is a large amount of cybersecurity data obtained. The present disclosure focuses on using this cybersecurity data for various purposes.

The network configuration 100A includes a server 200 located between the user 102 and the Internet 104. For example, the server 200 can be a proxy, a gateway, a Secure Web Gateway (SWG), Secure Internet and Web Gateway, Secure Access Service Edge (SASE), Secure Service Edge (SSE), etc. The server 200 is illustrated located inline with the user 102 and configured to monitor the user 102. In other embodiments, the server 200 does not have to be inline. For example, the server 200 can monitor requests from the user 102 and responses to the user 102 for one or more security purposes, as well as allow, block, warn, and log such requests and responses. The server 200 can be on a local network associated with the user 102 as well as external, such as on the Internet 104. The network configuration 100B includes an application 110 that is executed on the user device 300. The application 110 can perform similar functionality as the server 200, as well as coordinated functionality with the server 200. Finally, the network configuration 100C includes a cloud service 120 configured to monitor the user 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the users 102, using signatures sourced and constantly updated. The DNS security can identify and route command-and-control connections to threat detection engines for full content inspection. The DLP can use standard and/or custom dictionaries to continuously monitor the users 102, including compressed and/or Secure Sockets Layer (SSL)-encrypted traffic.

In some embodiments, the network configurations 100A, 100B, 100C can be multi-tenant and can service a large volume of the users 102. Newly discovered threats can be promulgated for all tenants practically instantaneously. The users 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of users 102 under management by an IT group, department, administrator, etc., i.e., some group of users 102 that are managed together. One advantage of multi-tenancy is the visibility of cybersecurity threats across a large number of users 102, across many different organizations, across the globe, etc. This provides a large volume of data to analyze, use machine learning techniques on, develop comparisons, etc.

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own users 102 and configuration, policy, rules, etc.

§ 1.1 Cloud Monitoring

The cloud 120 can scale cybersecurity monitoring and protection with near-zero latency on the users 102. Also, the cloud 120 in the network configuration 100C can be used with or without the application 110 in the network configuration 100B and the server 200 in the network configuration 100A. Logically, the cloud 102 can be viewed as an overlay network between users 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the users 102, as well as independent of platform, operating system, network access technique, network access provider, etc.

There are various techniques to forward traffic between the users 102 and the cloud 120. A key aspect of the cloud 120 (as well as the other network configurations 100A, 100B) is all traffic between the users 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Posture Control (ZPC), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services are also contemplated.

§ 1.2 Zero Trust

Figure 1B:
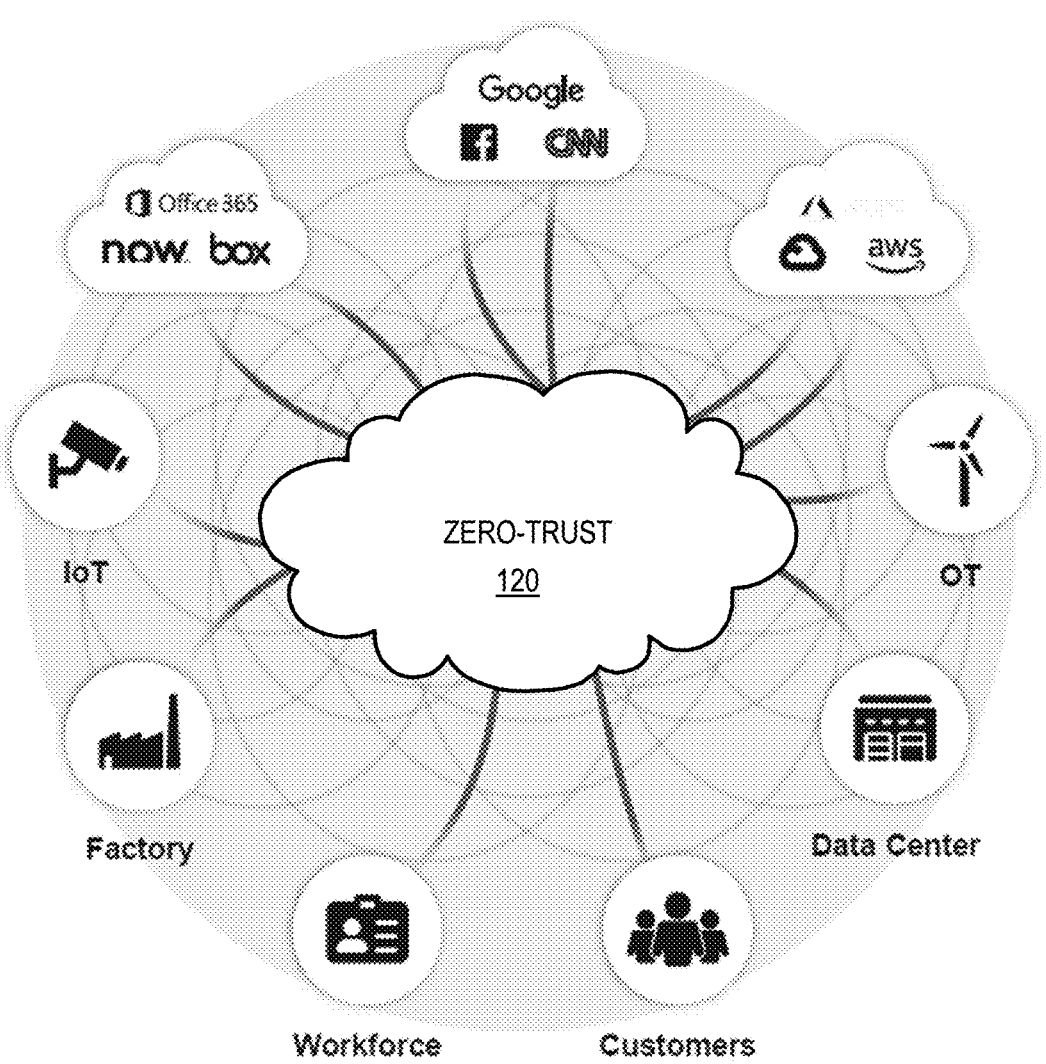
FIG. 1B is a logical diagram of the cloud in FIG. 1A operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120 Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud 120 and a comparison with the conventional firewall-based approach (appliance). Zero trust with the cloud 120 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

In an example, the aspects of cybersecurity can be categorized as follows: Prevent Compromise (PC), Data Loss (DL), Lateral Movement (LM), and Asset Exposure (AE) (or attack surface). The present disclosure contemplates cybersecurity monitoring and protection in one or more of these categories, as well as across all of these categories. The PC relates to events, security configurations, and traffic flow analysis and attributes, focusing on network compromise. DL relates to analyzing and monitoring sensitive data attributes to detect and defend against potential data leakage. LM includes analyzing and monitoring private access settings and metrics to detect and defend against lateral propagation risks. Finally, AE relates to analyzing and monitoring external attack surfaces across a range of publicly discoverable variables, such as exposed servers and Autonomous System Numbers (ASNs) to detect and defend vulnerable cloud assets.

§ 1.3 Log Data

With the cloud 120 as well as any of the network configurations 100A, 100B, 100C, the log data 130 can include a rich set of statistics, logs, history, audit trails, and the like related to various user 102 transactions. Generally, this rich set of data can represent activity by a user 102 and their associated user devices 300. This information can be for multiple users 102 of a company, organization, etc., and analyzing this data can provide a current cyber risk posture of the company. Note, the term user 102 can also be widely interpreted to also mean machines, workloads, IoT devices, or simply anything associated with the company that connects to the Internet, a Local Area Network (LAN), etc.

The log data 130 can include a large quantity of records used in a backend data store for queries. A record can a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active users 102 or more. Examples of the sparsely populated log data can be the Nanolog system from Zscaler, Inc., the applicant. Also, descriptions of such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is the cybersecurity monitoring is rich and provides a wealth of information to determine various assessments of cybersecurity.

§ 2.0 Example Server Architecture

FIG. 2 is a block diagram of a server 200, which may be used in as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc., § 3.0 Example User Device Architecture FIG. 3 is a block diagram of a user device 300, which may be used by a user 102. Specifically, the user device 300 can form a device used by one of the users 102, and this may include common devices such as laptops, smartphones, tablets, netbooks, personal digital assistants, cell phones, e-book readers, Internet-of-Things (IoT) devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Risk Monitoring

At present, there is a challenge in the process of measuring, quantifying, and remediating risk in networks. According to research, it has been found that customers manage risk through inferior third-party tools and/or manual input spreadsheets. Thus, due to the need for additional industry standards regarding network security risks and the need for better quality risk quantification tools, the systems and methods of the present disclosure provide embodiments that have the aim to address the current issues and improve the network security landscape, especially by offering one or more products that can accurately quantify or assess the effectiveness of a combination of security tools in use in a network. Currently, there are some efforts being made in this area, but an acceptable level of maturity has not yet been attained.

In particular, the present disclosure focuses on specific areas of security for reducing risk in a network. For example, some different security areas to which improvements can be directed include the fields of 1) Prevent Compromise (i.e., to prevent network compromise), 2) Lateral Movement Prevention (i.e., to prevent lateral movement attacks), 3) Data Loss Prevention, and 4) Asset Exposure Prevention (i.e., to reduce the attack surface of network resources or assets). The present disclosure addresses at least these four areas by configuring combinations of various security tools in order to quantify risk for reduction thereof. In particular, the systems and methods may be configured to perform this combined optimization by a single solution (e.g., a single hardware/software product). In some respects, this may provide network security operators or security stakeholders with a high-level view about their organization. Also, the solution described herein can give them the capability to look into various factors which can tremendously impact their risk and provide them with the necessary knowledge regarding possible areas of improvement.

The present disclosure may be configured to solve the above-stated problems, for example, by calculating the risk of a breach or attack by evaluating an organization's a) static and dynamic policy configurations, b) traffic patterns, and c) risk reduction capabilities. The present disclosure may also provide network security administrators and stakeholders with a prioritized and contextualized list of recommended changes to their deployment in order to improve their overall security posture and further mitigate their risk against all four areas of Prevent Compromise (PC), Data Loss (DL), Lateral Movement (LM), and Asset Exposure (AE) (or attack surface). Also, as a result of leveraging capabilities, the systems and methods may provide historical data allowing the user to view a company's risk score as it changes over time, which can also be compared with industry peers. In some embodiments, the Risk Score may be calculated using the following formula:

$$\text{Risk Score} =$$
$$\left(100 * \left(PC/\text{total\_possible\_PC}\right) + 100 * \left(DL/\text{total\_possible\_DL}\right) + \right.$$
$$\left. 100 * \left(LM/\text{total\_possible\_LM}\right) + 100 * \left(AE/\text{total\_possible\_AE}\right)\right)/4$$

That is, the Risk Score may be the average of the percentages of each of the four categories with respect to their highest possible values. Thus, the Risk Score may range from 0 to 100, in an example.

Figure 4:
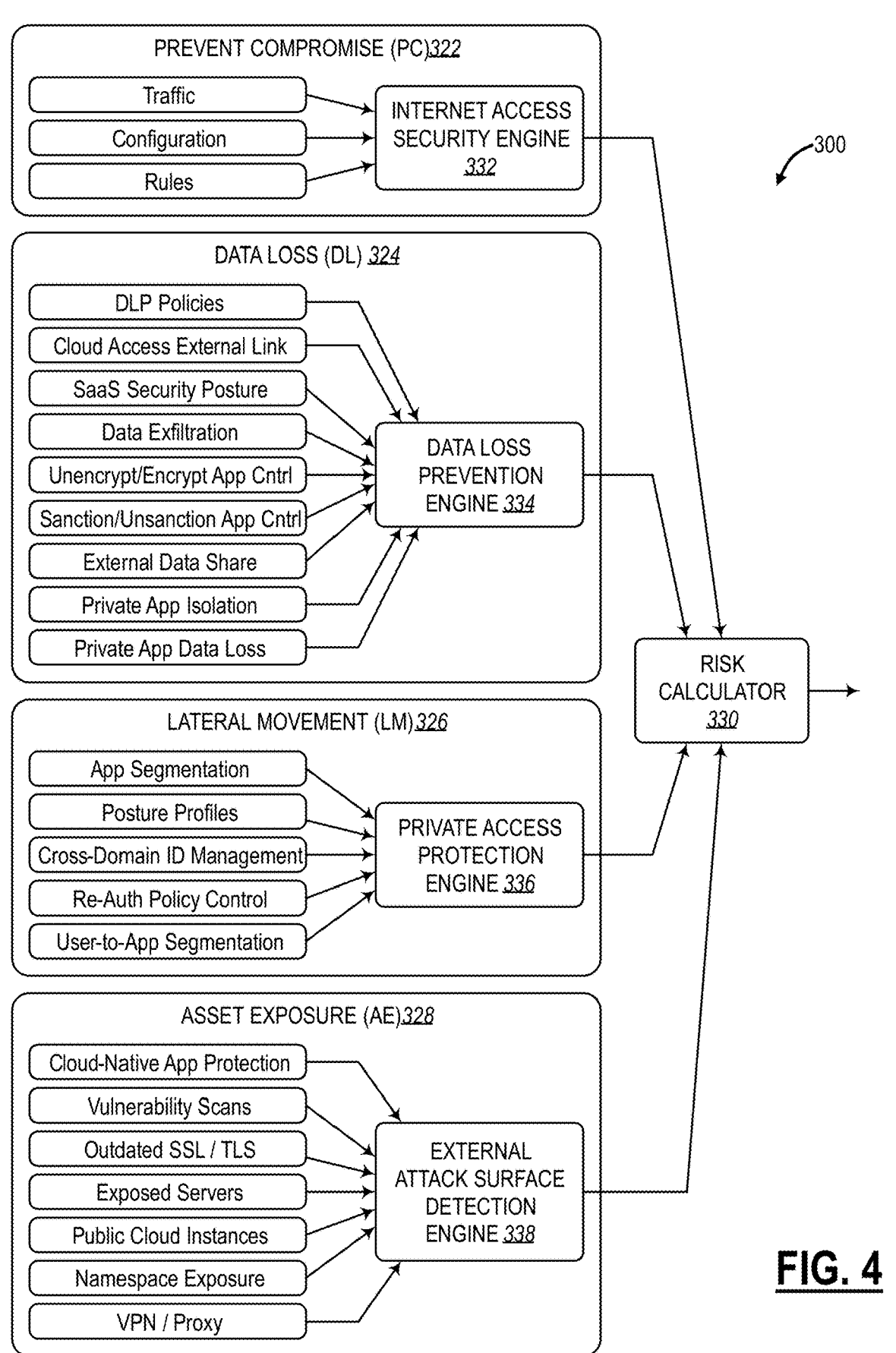
FIG. 4 is a diagram illustrating an embodiment of a system for analyzing or assessing the status of a network with respect to the four categories of Prevent Compromise (PC), Data Loss (DL), Lateral Movement (LM), and Asset Exposure (AE) and determining or quantifying risk therefrom.

FIG. 4 is a diagram illustrating an embodiment of a system 300 for analyzing or assessing the status of a network with respect to the four categories of PC, DL, LM, and AE and determining or quantifying risk therefrom. The system 300 may include any suitable combination of hardware (or physical) components and/or software/firmware (or virtual) components for performing various functions in order to obtain some calculation, determination, and/or quantification of risk, based on the log data 130. As shown in this embodiment, the system 300 includes a Prevent Compromise (PC) unit 322, a Data Loss (DL) unit 324, a Lateral Movement (LM) unit 326, and an Asset Exposure (AE) unit 328. The units 322, 324, 326, 328 are configured to provide respective outputs to a risk calculator 330, which is configured to consider each of the calculations with respect to PC, DL, LM, and AE and calculate a risk score. As described herein, the risk score is something used to quantify cyber risk. The risk score can be a number, on a scale, or anything that is meaningful to a stakeholder.

As illustrated, the PC unit 322 is configured to monitor, measure, assess, and/or obtain (in any suitable manner) elements with respect to Traffic, Configuration, and Rules and is configured to supply these elements to an Internet Access Security Engine 332. The Traffic element may include traffic related to any of Unauthenticated, Unscanned SSL, Firewall, Intrusion Prevention System (IPS), and the like. The Configuration element may include configurations related to any of Advance Threat Protection, Malware Protection, Advanced Settings, Mobile Threats, URL Filter and Cloud App Control, Browser Control, File Transfer Protocol (FTP) Control, and the like. The Rules element may include rules related to any of Inline Sandboxing, URL Filters, File Type Control, Firewall Control, Non-Web IPS Control, and the like.

The DL unit 324 is configured to monitor, measure, assess, and/or obtain (in any suitable manner) elements with respect to DLP Policies, Cloud Access Security External Links, SaaS Security Posture, Data Exfiltration, Unencrypted/Encrypted Application Control, Sanctioned/Unsanctioned Application Control, External Data Share, Private App Isolation, Private App Data Loss, and the like. These elements are configured to be supplied to a Data Loss Prevention Engine 334. The DLP Policies element may include policies related to any of Configuration, Content/Contextual Control, Violations, and the like.

The LM unit 326 is configured to monitor, measure, assess, and/or obtain (in any suitable manner) elements with respect to App Segmentation, Posture Profiles, Cross-Domain Identity Management, Re-Authorization Policy Control, User-to-App Segmentation, and the like. These elements are configured to be supplied to a Private Access Protection Engine 336. The App Segmentation element may include segmentation features related to Wide Open Port Config and the like. The Cross-Domain Identity Management element may include management features related to any of managing groups in access policies, enabling/disabling control, and the like.

The AE unit 328 is configured to monitor, measure, assess, and/or obtain (in any suitable manner) elements with respect to a Cloud-Native Application Protection Platform (CNAPP), Vulnerability Scans, Outdated SSL or TLS, Exposed Servers, Public Cloud Instances, Namespace Exposure, VPN/Proxy, and the like. These elements are configured to be supplied to an External Attack Surface Detection Engine 338.

The Internet Access Security Engine 332 is configured to output a PC security risk component to the risk calculator 330. The Data Loss Prevention Engine 334 is configured to output a DL security risk component to the risk calculator 330. The Private Access Protection Engine 336 is configured to output an LM security risk component to the risk calculator 330. Also, the External Attack Surface Detection Engine 338 is configured to output an AE security risk component to the risk calculator 330. The risk calculator 330 receives the PC security risk component, DL security risk component, LM security risk component, and the AE security risk component and is configured to calculate a risk score and/or an effectiveness score. The risk calculator 330 may store the highest possible score for each of the PC, DL, LM, and AE scores and use these as a reference to determine how well the network is able to perform with respect to each specific category.

The PC (and the associated protection from network compromise), LM (and the associated protection from lateral movement), DL (and the associated protection from data loss), and AE (and the associated protection from asset exposure or reduction of attack space) are cumulatively considered to be the focus of efforts for analyzing or assessing network status with respect to various types of attacks, breaches, etc. and then for reducing or eliminating these attacks, breaches, etc. Some security software products may have various capabilities, such as Identity and Access Management functionality, Network Services functionality, Platform Security functionality, IT Asset Management functionality, Application Security functionality, and the like.

FIG. 5 is a flowchart of a process 340 for determining the effectiveness of combination of security components for mitigating risk in a network. The process 340 contemplates implementation as a computer-implemented method having steps, via a computer or other suitable processing device or apparatus configured to implement the steps, via the cloud 120 configured to implement the steps, and as a non-transitory computer-readable medium storing instructions that, when executed, cause one or more processors to implement the steps.

The process 340 includes analyzing a network to measure security parameters associated with the use of one or more network security tools that are configured for mitigating risk with respect to network compromise (or PC), lateral movement (LM), data loss (DL), and asset exposure (AE) (step 342). Based on the measured security parameters, the process 340 includes quantifying the one or more network security tools to determine an effectiveness score defining an ability of the one or more network security tools, in combination, to counteract the network compromise, lateral movement, data loss, and asset exposure (step 344).

The process 340 may further include the steps of 1) determining one or more recommendations for changing configuration settings of the one or more network security tools in order to mitigate the risk and increase the effectiveness score and 2) displaying the effectiveness score and the one or more recommendations on a dashboard of a user interface of a computing device associated with a network security administrator. The process 340 may further include the steps of evaluating a) static and dynamic configurations of security policies offered by the one or more network security tools, b) traffic patterns associated with the network, and c) the ability of the one or more network security tools, in combination, to counteract the network compromise, lateral movement, data loss, and asset exposure. Then, in response to the evaluating step, the process 340 may calculate a security risk score indicating a current level of risk that the network faces against one or more types of attacks.

In some embodiments, the process 340 may include the step of recording a plurality of effectiveness scores over time to obtain a historical view of the network. Also, the process 340 may include the step of adjusting an insurance actuary model based on the effectiveness score. The one or more network security tools, for example, may include multiple applications and/or services supplied by multiple vendors. The effectiveness score, for example, may include a Prevent Compromise (PC) score indicative of an ability to prevent network compromise, a Lateral Movement (LM) score indicative of an ability to prevent lateral movement, a Data Loss (DL) score indicative of an ability to prevent data loss, and an Asset Exposure (AE) score indicative of an ability to reduce an attack space. The effectiveness score may be calculated based on the following formula:

$$
\begin{aligned}
\text{Effectiveness Score} = \\
(100 * (PC/\text{highest} - \text{possible} - PC) + 100 * (LM/\text{highest} - \text{possible} - LM) + \\
100 * (DL/\text{highest} - \text{possible} - DL) + 100 * (AE/\text{highest} - \text{possible} - AE))/4.
\end{aligned}
$$

The network compromise, which is examined in order to quantify the one or more network security tools, may be a factor of one or more of a) traffic analysis, b) configuration analysis, and c) rules analysis. The traffic analysis may include analysis with respect to one or more of 1) unauthenticated traffic, 2) unscanned Secure Sockets Layer (SSL) traffic, 3) firewall-based traffic, and 4) traffic based on intrusion prevention. Configuration analysis may include analysis with respect to one or more of 1) advanced treat protection, 2) malware protection, 3) advanced settings, 4) mobile threats, 5) URL filters, 6) cloud app control, 7) browser control, and 8) FTP control. Rules analysis may include analysis with respect to one or more of 1) inline sandboxing, 2) URL filtering, 3) file type control, 4) firewall control, and 5) non-web intrusion prevention control.

The lateral movement, which is examined in order to quantify the one or more network security tools, may be a factor of one or more of a) app segmentation, b) posture profiles, c) cross-domain identity management, d) re-authentication policy control, and e) user-to-app segmentation. The data loss, which is examined in order to quantify the one or more network security tools, may be a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss. The asset exposure, which is examined in order to quantify the one or more network security tools, may be a factor of one or more of a) cloud-native application protection, b) vulnerability, c) outdated Secure Sockets Layer (SSL) or Transport Layer Security (TLS), d) exposed servers, e) public cloud instances, f) namespace exposure, and g) Virtual Private Network (VPN) proxy.

Security service customers (e.g., companies, enterprises, etc.) are challenged in measuring, quantifying, and remediating risk. Customers often attempt to manage risk through a variety of third-party tools (e.g., vulnerability management software, attack surface reports, Global Risk and Compliance systems, simple spreadsheets etc.). At times, customers may rely on vague, manually input data in spreadsheets. There is no conventional tool or standard for risk quantification that consumes security data from a customer's environment and provides a real view of risk, although some attempts have been made. There is a need in the field of network security to utilize data around a customer's environment, including high risk activities from various entities, configuration and external attack surface data, etc. There is also a need to provide security service customers with a holistic, comprehensive, and actionable risk framework. Furthermore, by focusing on driving actionable recommendations through intuitive workflows, the systems and methods of the present disclosure are configured to help customers reduce their risk exposure. The present embodiments are configured to provide powerful concepts such as the User/Company Risk Score and Config Risk Score. In some embodiments, the underlying logic for these features can be subsumed into a new product or risk assessment model along with assessment scores of other attributes.

At the highest level, the Security Exchange Commission (SEC) and New York State Department of Financial Services, will require Board level accountability for Cybersecurity Risk Management, Strategy, Governance, and Incident Disclosure. According to embodiments described herein, the systems and methods of the present disclosure are configured to provide users (e.g., Chief Information Security Officers (CISOs) and their teams) with real-time insights into their current risk score and where they stand compared to their peers. The systems and methods also provide them with important notifications on actionable events or deviations from their baseline (e.g., in case of a policy deviation or newly discovered vulnerability). This may include providing a dashboard reporting view, providing information through real-time alerting, and/or providing reports via API exports and ingestion (e.g., from third-party data sources). The systems and methods may start with a focus on leveraging existing datasets (e.g., external attack surface reports, Internet access reports, private network access reports, etc.). The embodiments may also gradually explore enriching these data sets over time, as well as leveraging third-party data.

§ 4.1 Visualizing Risk

A User Interface may be configured to display risk by taking into account any number of contributing factors and provide one or more actionable recommendations for each contributing factor. The UI can display financial data, historic data, peer data, etc. The users may be allowed to perform certain UI actions to override certain features. It may be understood that the UI may include any suitable system and may be built to be able to take in more contributing factors and cards as they are created. Thus, using firmware downloads, these new features can be added to continue to improve the functionality of the present systems and methods.

In some embodiments, the UIs may be configured to include entity mappings and data requirements. A main entities page (e.g., for users, third-parties, applications, cloud assets, etc.) may show risky users (e.g., in a list), user risk scores, risky third parties, high-level stats, distribution of risk scores, risky locations or departments, etc. Risky third parties may access browser-based application segments, which may be an unmanaged device accessing a console or a user accessing a SaaS application via identity proxy. A risky user list may pull data from a private access service and may include username, location, risk score, etc.

The private access services and/or client connect services may include the ability to tag app segments as for third parties or B2B. Risky applications may include risky SaaS applications, which can pull data on high-risk index apps (e.g., unsanctioned, risky apps) from an IT report. It can also pull data on third party applications from an IT report. The pulled data may include default columns, applications, application categories, total bytes, users, risk indices, etc. A drawer may show the user more information from the SaaS security report. The risky private applications can include specific application segments, which may include only the top app segments (e.g., top 10 segments) that have the most policy blocks. This may also show a drawer on a diagnostics page from the private access app segment.

For unsanctioned segments, this may include shadow IT. Sanctioned segments may include 1) third party risk (or oversharing), 2) plug-ins, and/or 3) SSPM risk (e.g., incorrect settings). For example, data may be pulled on third party plug-ins from Internet access shadow IT reports. Risky assets (e.g., risky devices, workloads, Operational Technology (OT) assets, servers, cloud assets, etc.) may further be configured to be showcased as a list of risky Internet of Things (IoT) assets seen in the Internet access service. In some embodiments, this may simply be shown as a list of risky users, which may essentially be the same list as the risky users, but, instead of username, it may include device information.

If a customer's app does not have Posture Control functionality (e.g., Cloud-Native Application Protection Platform (CNAPP) or the like), then the UI may show a list of exposed servers in a public cloud namespace. The UI may list "public cloud instances" from External Attack Surface reports. In some embodiments, if a customer's app does have Posture Control functionality, then the UI may be configured to show top categories that can map to a workload, top 10 risky assets (e.g., by asset type), etc. In some embodiments, the cloud asset list may include default columns with asset name, asset type, risk level, alerts, etc. For example, assets may factor into container registries and workloads in certain ways. The systems and methods may also store additional datasets, such as by parsing subdomains of attack surface reports to fine and report specific VPN vulnerabilities, by adding additional attributes to external attack surface contributing factors based on gap analysis on what is available, what can already be leveraged, and/or what other vendors may show. Also, the additional datasets may enrich various factors (e.g., infected clients, data loss events, exposed servers, etc.) with geological IP data, which can be stored and displayed on a map included in the UI. In addition, the datasets may be obtained from various data sources, such as Posture Control apps, Deception apps, etc.

Figure 6:
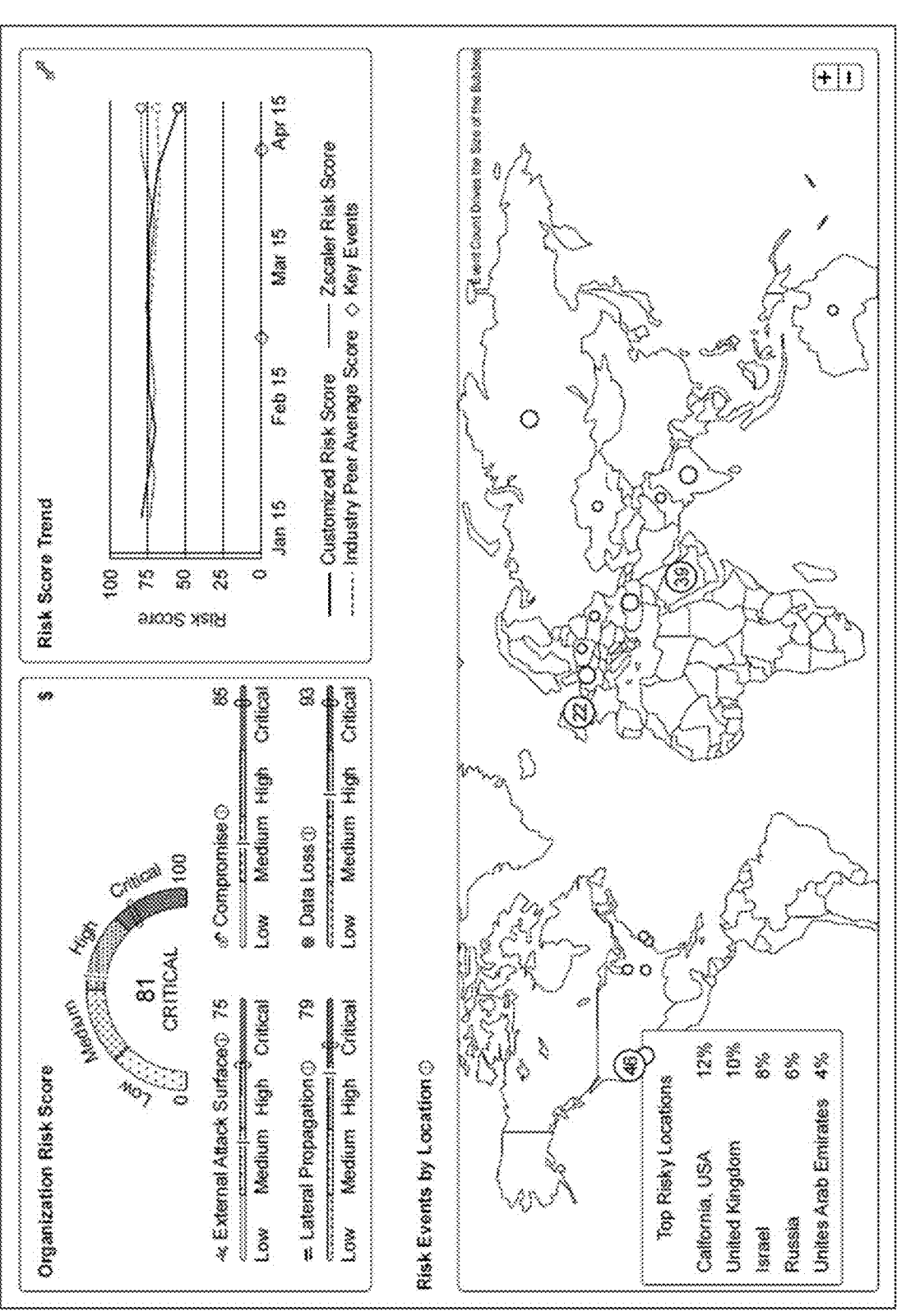
FIG. 6 is a screenshot of a user interface for displaying risk.

FIG. 6 is a screenshot of a user interface for displaying risk. The UI provides Powerful Risk Quantification, Intuitive Visualization & Reporting, and Actionable Remediation. The risk score gives a holistic risk measurement and visualization framework for remediating risk by using real data from the cloud-based system 100. Thus, the risk score processes data from various sources to provide unique, data-driven insights—several data sources (e.g., internet access configurations and traffic profiles, private access segmentation maturity, etc.) as well as external sources are used.

The risk is visualized across four stages of breach—

(1) External Attack Surface-Looks across a broad range of publicly discovery variables such as exposed servers and exposed Autonomous System Numbers (ASNs) to determine sensitive cloud assets.

(2) Prevent Compromise-Looks at a range of broad range of events, security configurations, and traffic flow attributes to compute the likelihood of compromise.

(3) Lateral Propagation-Looks at a range of private access settings and metrics and computes lateral propagation risk.

(4) Data Loss-Looks at a range of sensitive data attributes to see if data might be leaking out.

Figure 7:
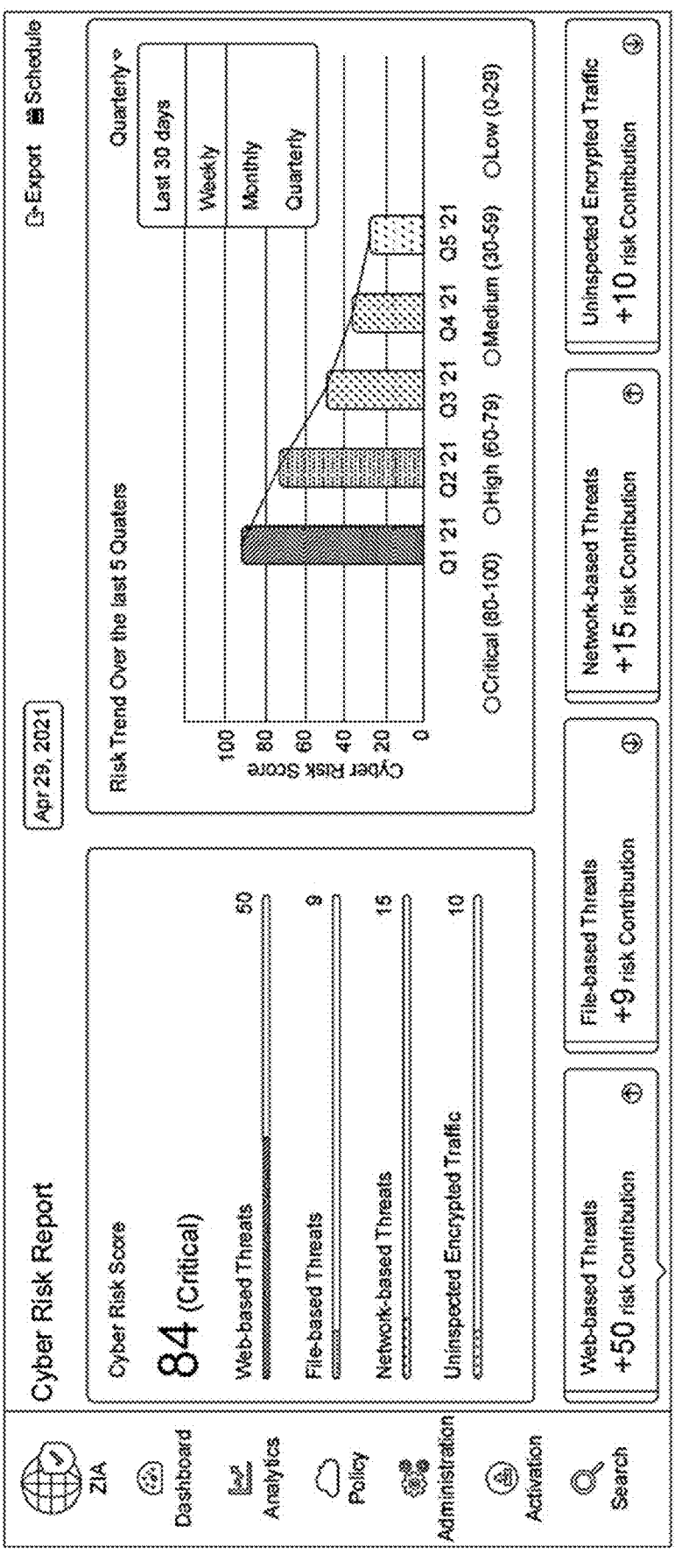

FIGS. 7-12 are a series of screenshots of another user interface for displaying a risk score. FIG. 7 is a visualization of a calculated risk score as well as a graph illustrating the trends. There are also panels for the various components in the risk score, namely Web-based Threats, File-based Threats, Network-based Threats, and Uninspected Encrypted Traffic Threats. A user may select any of the panels for additional details. FIGS. 8-12 are an example of the Web-based Threats, the File-based Threats, the Network-based Threats, and the Uninspected Encrypted Traffic Threats.

§ 5.0 Financial Modeling of Cyber Risk

The aforementioned description provides an effective methodology to quantify cyber risk technically. However, cybersecurity is not just a technical concern but a critical business issue. The ability to quantify cybersecurity risks in financial terms is pivotal for informed decision-making (e.g., what should I prioritize), technology investments (e.g., what approaches do I need), and resource allocation (e.g., where is the best place to put resources to minimize the most risk). That is, there is a need to further quantify risk in terms of what we should do about it. In addition to quantifying the risk as described above, the present disclosure includes a cutting-edge financial modeling capability designed to provide organizations with a clear, quantifiable measure of their cybersecurity risk and the associated financial implications.

The present disclosure includes risk quantification that evaluates an organization's existing security posture by analyzing data across their IT environment (e.g., the log data 130). This evaluation can generate a risk score ranging from 0 (indicating a very high security posture) to 100 (signifying the highest likelihood of suffering a cyber event). This score is used in the subsequent financial risk analysis.

§ 5.1 Challenges of Measuring Cybersecurity Risk Financially

Traditionally, quantifying cybersecurity risks in financial terms has been a complex endeavor for several reasons:

(1) Intangibility of Cyber Risks: Cyber risks often are difficult to score and measure, which leads to challenges in quantifying financial loss attributable to various technology capabilities/cyber risks.

(2) Dynamic Cyber Threat Landscape: The ever-evolving nature of cyber threats adds complexity to predicting potential financial impacts accurately.

(3) Lack of Standardized Metrics: The absence of universally accepted metrics for measuring cybersecurity risk has historically led to inconsistent and subjective assessments.

To address these challenges, the present disclosure includes a quantitative framework that combines industry-specific data with a Monte Carlo simulation approach, offering a more accurate, objective, and comprehensive financial risk assessment.

§ 5.2 Process of Financially Modeling Cyber Risk

FIG. 13 is a flowchart of a process 400 of financially modeling cyber risk. The process 400 contemplates implementation as a computer-implemented method having steps, via a computer or other suitable processing device or apparatus configured to implement the steps, via the cloud 120 configured to implement the steps, and as a non-transitory computer-readable medium storing instructions that, when executed, cause one or more processors to implement the steps.

The process 400 includes obtaining cybersecurity monitoring data for an organization where the cybersecurity monitoring data is from a plurality of sources including from cybersecurity monitoring of a plurality of users associated with the organization (step 402); determining a current cyber risk posture of the organization based on the cybersecurity monitoring data (step 404); determining inputs for a Monte Carlo simulation to characterize financial losses of the organization due to a cyber event in a predetermined time period based on (1) an associated industry of the organization, (2) a size of the organization, and (3) the current cyber risk posture of the organization (step 406); performing a plurality of trials of the Monte Carlo simulation utilizing the inputs (step 408); and displaying a risk distribution curve based on results of the plurality of trials where the risk distribution curve plots a curve of losses versus a probability (step 410).

The cybersecurity monitoring data can be based on a current security posture of the organization such as current licenses of security services offered by the cloud 120, and the process 400 can further include determining updated cyber risk posture for the organization utilizing mitigation factors to address the current cyber risk posture; determining updated inputs for the Monte Carlo simulation based on (1) the associated industry, (2) the size, and (3) the updated cyber risk posture; performing an updated plurality of trials of the Monte Carlo simulation utilizing the updated inputs; and displaying an updated risk distribution curve based on results of the updated plurality of trials along with the risk distribution curve based on results of the plurality of trials.

A Monte Carlo simulation is a technique which is used to estimate the possible outcomes of an uncertain event. The simulation builds a distribution of possible results by leveraging a probability distribution for any variable that has inherent uncertainty, and recalculates the results over and over, each time using a different set of random numbers to produce a large number of likely outcomes. Monte Carlo Simulations are also utilized for long-term predictions due to their accuracy. As the number of inputs increase, the number of forecasts also grows, allowing you to project outcomes farther out in time with more accuracy. When a Monte Carlo Simulation is complete, it yields a range of possible outcomes with the probability of each result occurring.

Figure 14:
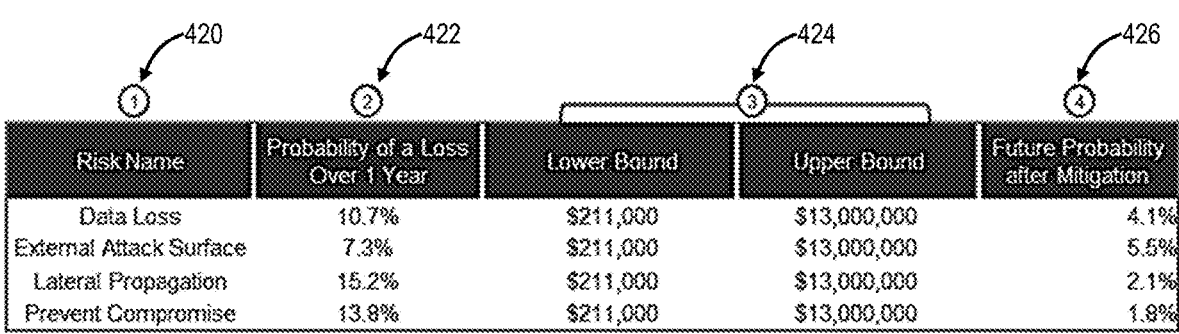
FIG. 14 is a table of example inputs for the Monte Carlo Simulation used in the process of FIG. 13.

FIG. 14 is a table of example inputs for the Monte Carlo Simulation. The inputs include cyber risks 420 (What is the organizational cyber capability effectiveness today?), probability of a loss 422 (e.g., How likely is it that the risk event occurs over one year?), bounds 424, and future probabilities 424. The bounds 424 define a lower/upper bound (confidence interval) for the financial t of a cyber risk, i.e., In what range will the financial damages most likely be in case the risk event occurs? The future probabilities 424 assign control effectiveness, i.e., risk mitigation, i.e., How much does a better solution mitigate the potential damages based on alignment to MITRE ATT&CK framework?

We run randomized trials, for each of which an individual simulated inherent loss is calculated based on randomized risk event probability (probability of a loss 422) and a randomized financial impact (bounds 424) within the defined confidence interval. The randomized trials will generate a risk distribution curve, based on simulated losses and the probability of realizing the associated loss.

Figure 15:
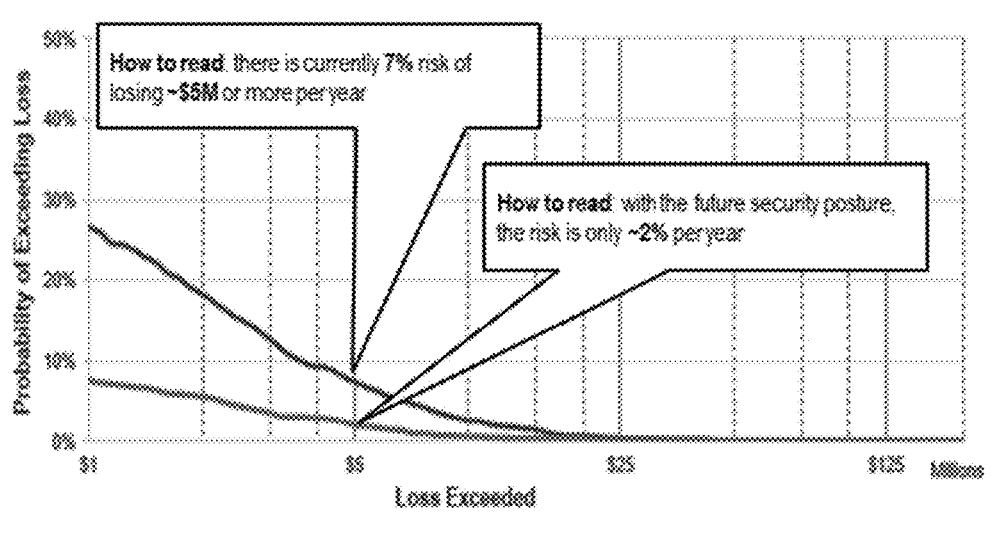
FIG. 15 is a graph of a risk distribution curve.
Figure 17:
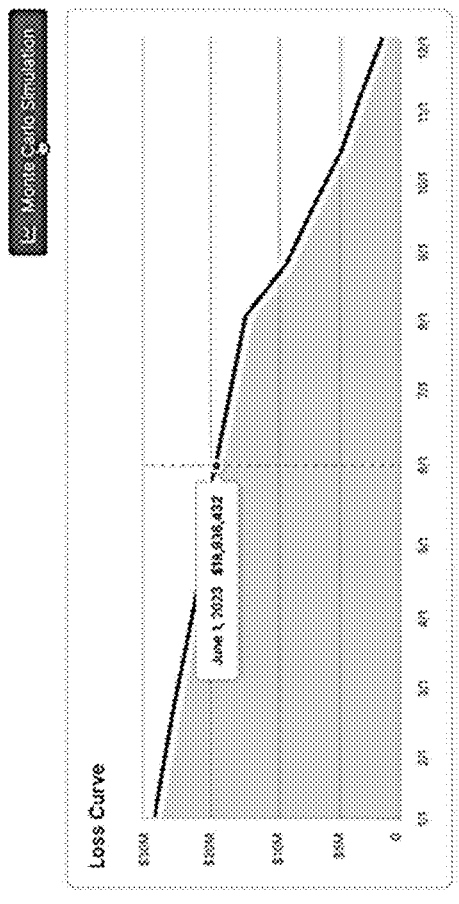
FIG. 17 is a user interface of financial risk, a summary, a loss curve, and contributing factors.
Figure 18:
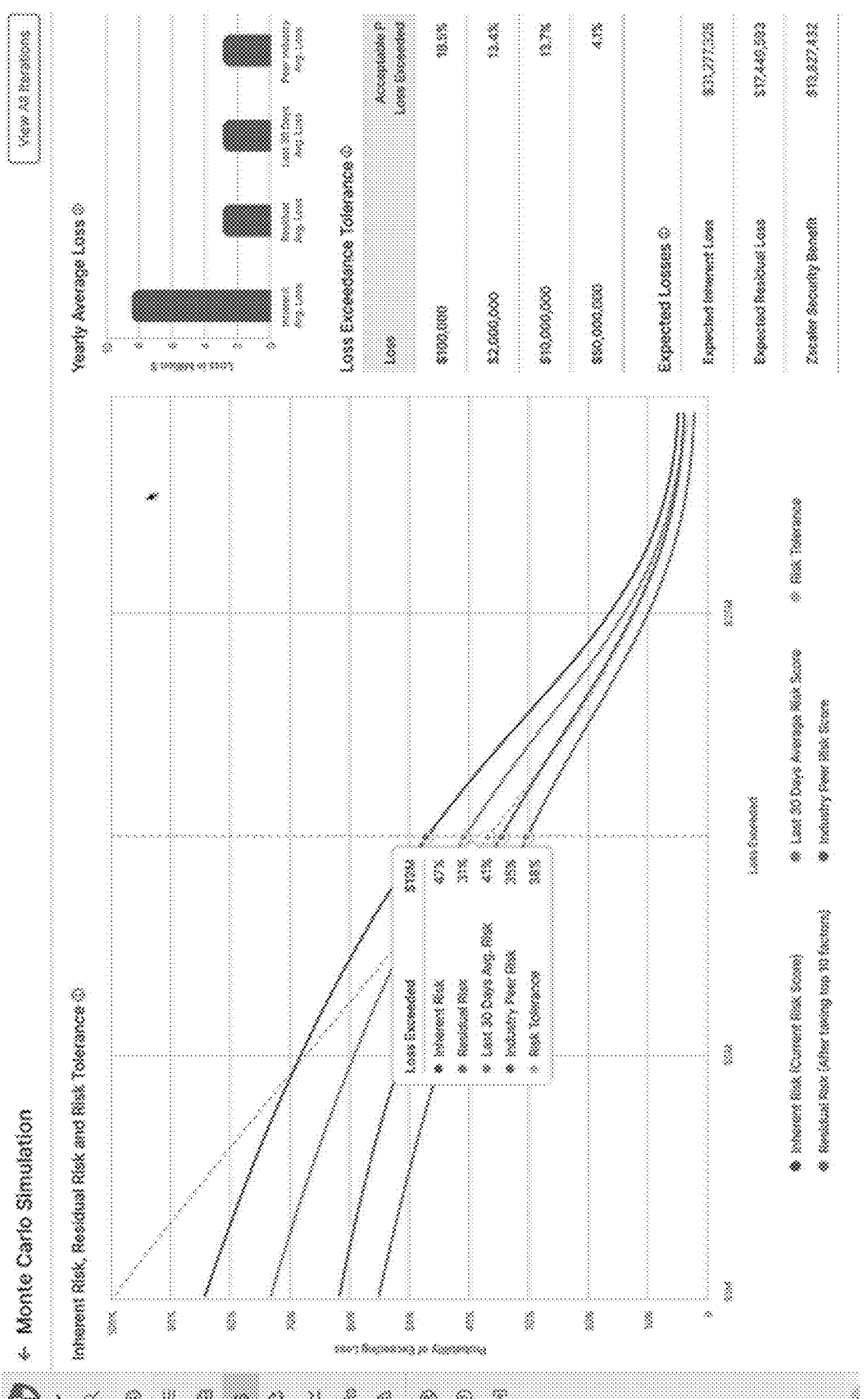
FIG. 18 is a graph of a Monte Carlo simulation.
Figure 19:
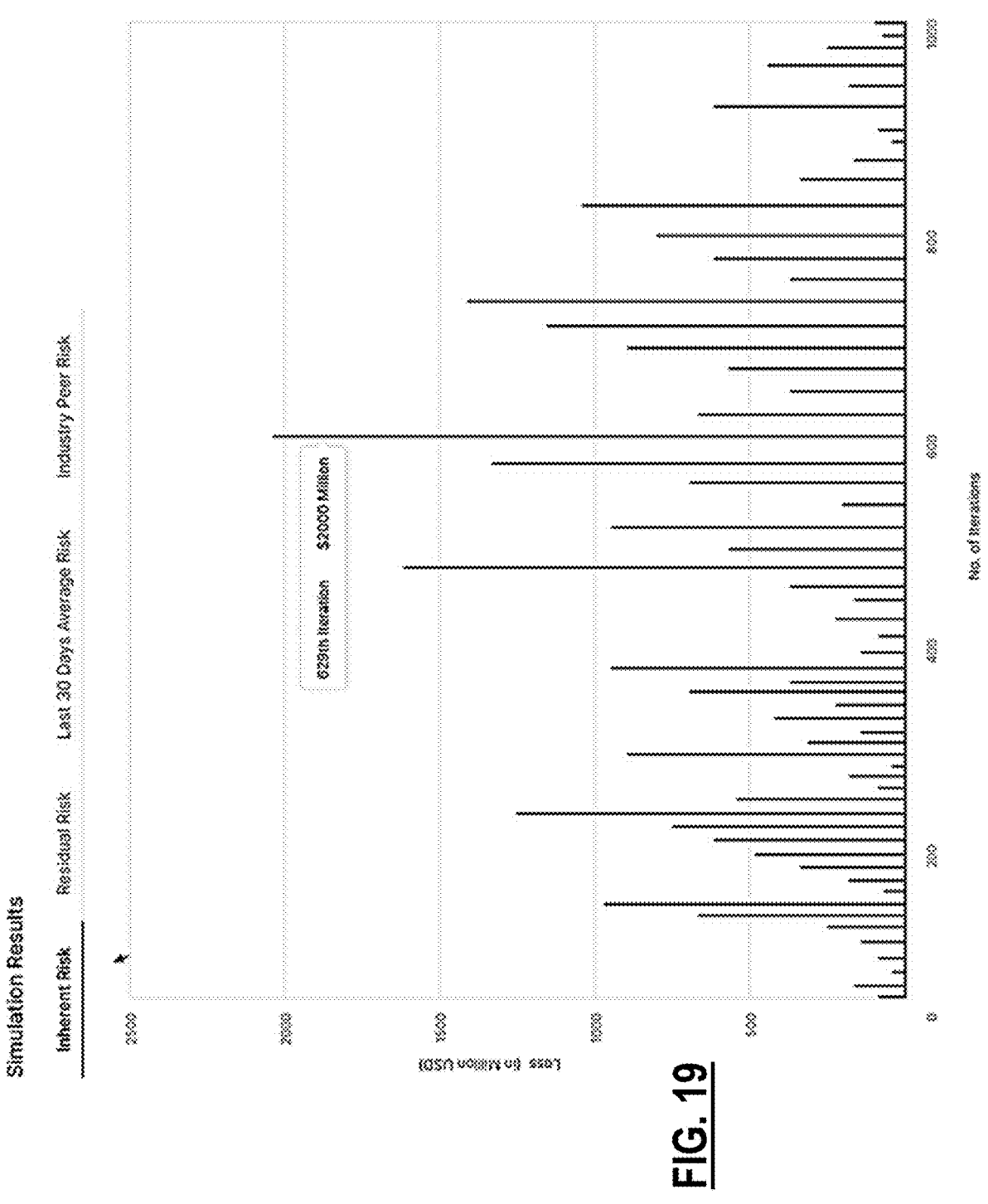
FIG. 19 is a graph of individual trial results of the Monte Carlo simulation.

The process 400 can further include identifying a plurality of risk factors in the current cyber risk posture and assigning financial exposures to the plurality of risk factors; and displaying the plurality of risk factors, the corresponding financial exposures, and recommended actions. FIG. 15 is a graph of a risk distribution curve. FIG. 16 is a table illustrating risk reduction quantification. FIG. 17 is a user interface of financial risk, a summary, a loss curve, and contributing factors. FIG. 18 is a graph of a Monte Carlo simulation. FIG. 19 is a graph of individual trial results of the Monte Carlo simulation.

The process 400 can further include performing cybersecurity monitoring of the plurality of users associated with the organization via a cloud service; and logging the cybersecurity monitoring data based on the cybersecurity monitoring. The process 400 can further include displaying a comparison of the organization to peers. For example, the cloud 120, being multi-tenant, can provide comparisons of peer organizations. Of note, peers can be anonymous. The process 400 can further include identifying and prioritizing remediation in the current cyber risk posture based on associated financial impact, such as in FIG. 17.

The current cyber risk posture can be a score based on a combination of a Prevent Compromise (PC) score indicative of an ability to prevent network compromise, a Data Loss (DL) score indicative of an ability to prevent data loss, a Lateral Movement (LM) score indicative of an ability to prevent lateral movement, and an Asset Exposure (AE) score indicative of an ability to reduce an attack space.

Network compromise, which is examined in order to quantify the one or more network security tools, is a factor of one or more of a) traffic analysis, b) configuration analysis, and c) rules analysis. Traffic analysis includes analysis with respect to one or more of 1) unauthenticated traffic, 2) unscanned Secure Sockets Layer (SSL) traffic, 3) firewall-based traffic, and 4) traffic based on intrusion prevention, configuration analysis includes analysis with respect to one or more of 1) advanced treat protection, 2) malware protection, 3) advanced settings, 4) mobile threats, 5) URL filters, 6) cloud app control, 7) browser control, and 8) FTP control, and rules analysis includes analysis with respect to one or more of 1) inline sandboxing, 2) URL filtering, 3) file type control, 4) firewall control, and 5) non-web intrusion prevention control.

Data loss, which is examined in order to quantify the one or more network security tools, is a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss. Lateral movement, which is examined in order to quantify the one or more network security tools, is a factor of one or more of a) app segmentation, b) posture profiles, c) cross-domain identity management, d) re-authentication policy control, and e) user-to-app segmentation. Asset exposure, which is examined in order to quantify the one or more network security tools, is a factor of one or more of a) cloud-native application protection, b)

vulnerability, c) outdated Secure Sockets Layer (SSL) or Transport Layer Security (TLS), d) exposed servers, e) public cloud instances, f) namespace exposure, and g) Virtual Private Network (VPN) proxy.

§ 6.0 Security Coverage Based on MITRE ATT&CK Framework

The present disclosure aims to provide Chief Information Security Officers (CISOs) with a holistic framework for security risk quantification and measurement to defend their environments against cyberattacks. As described, the present systems provide an assessment of security configurations contributing to various risk scores of the organization. Because new and complex attacks are continuously created, organizations can struggle to understand how attackers operate. Because of this, it is increasingly difficult for organizations to achieve their security objectives. Even further, it can be difficult to understand what existing defenses can cover as a whole, and what future investments are needed to prevent attacks. That is, it is difficult to completely understand what the security solutions currently operated by organizations actually cover, i.e., to understand what the various security services described herein by the cloud 120 actually cover when they are executed in customer IT environments.

Figure 20:
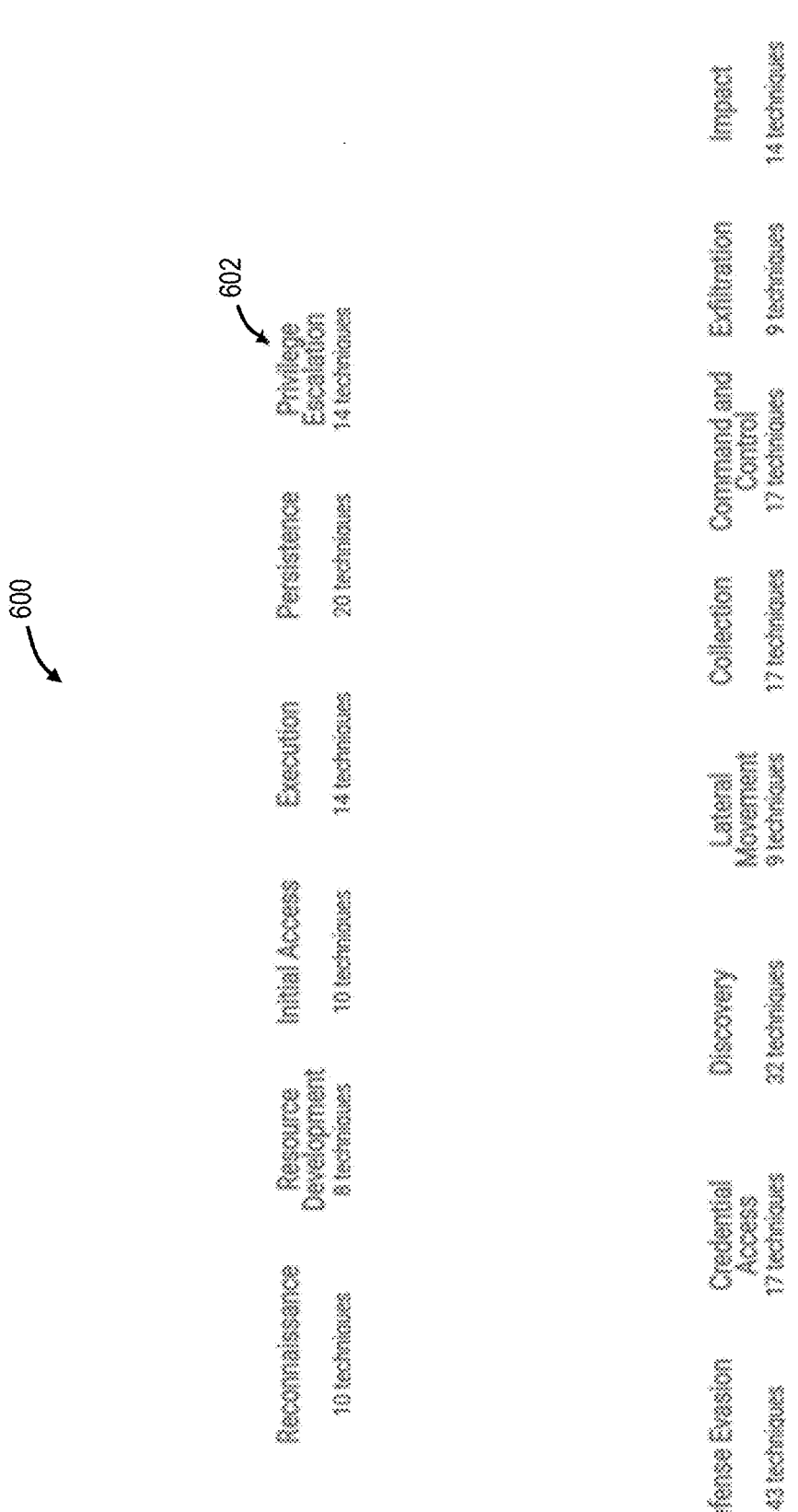
FIG. 20 is a diagram of the MITRE Enterprise Matrix.

MITRE Corporation has developed the open source, web based Adversarial Tactics, Techniques, and Common Knowledge (ATT&CK) framework to systematically document and catalog adversaries' behaviors based on millions of data points observed from real-life attacks and breaches. The model is built to describe the Tactics, Techniques, and Procedures (TTPs) used by adversaries and breaks them into various categories based on the sequence of steps involved in attacks. FIG. 20 is a diagram of the MITRE Enterprise Matrix 600. The Enterprise Matrix 600 includes 14 tactics 602 each with associated techniques and sub-techniques. The various tactics 602 represent an adversary's tactical objectives for performing an action. The MITRE Enterprise Matrix 600 provides 201 techniques and 424 sub-techniques representing how an adversary achieves a tactical objective with greater detail including actions and specific tools used.

It will be appreciated that although the present examples refer to the MITRE ATT&CK framework, other catalogs of known malicious tactics are contemplated and can be overlayed with cybersecurity data as described herein. For example, the NIST cybersecurity framework can also be utilized as described herein.

The present systems and methods include pulling live data based on a customers licensing with the various services provided by the cloud 120. For example, the cybersecurity data collected by the cloud 120 can include current licenses of security services configured within an organizations cloud environment, thereby the data includes information relating to which security services an organization has access to within their cloud environment. That is, the systems are adapted to provide an interactive UI as part of the various UIs described herein for customers to visualize the coverages which they can have access to via the cloud 120 and its various security services. Further, the UI is adapted to show the hypothetical coverages by utilizing color coding within the UI to visualize TTPs which the services offered by the cloud 120 can cover if configured. This interactive UI can be accessed via a frameworks page of the various UIs.

Figure 21:
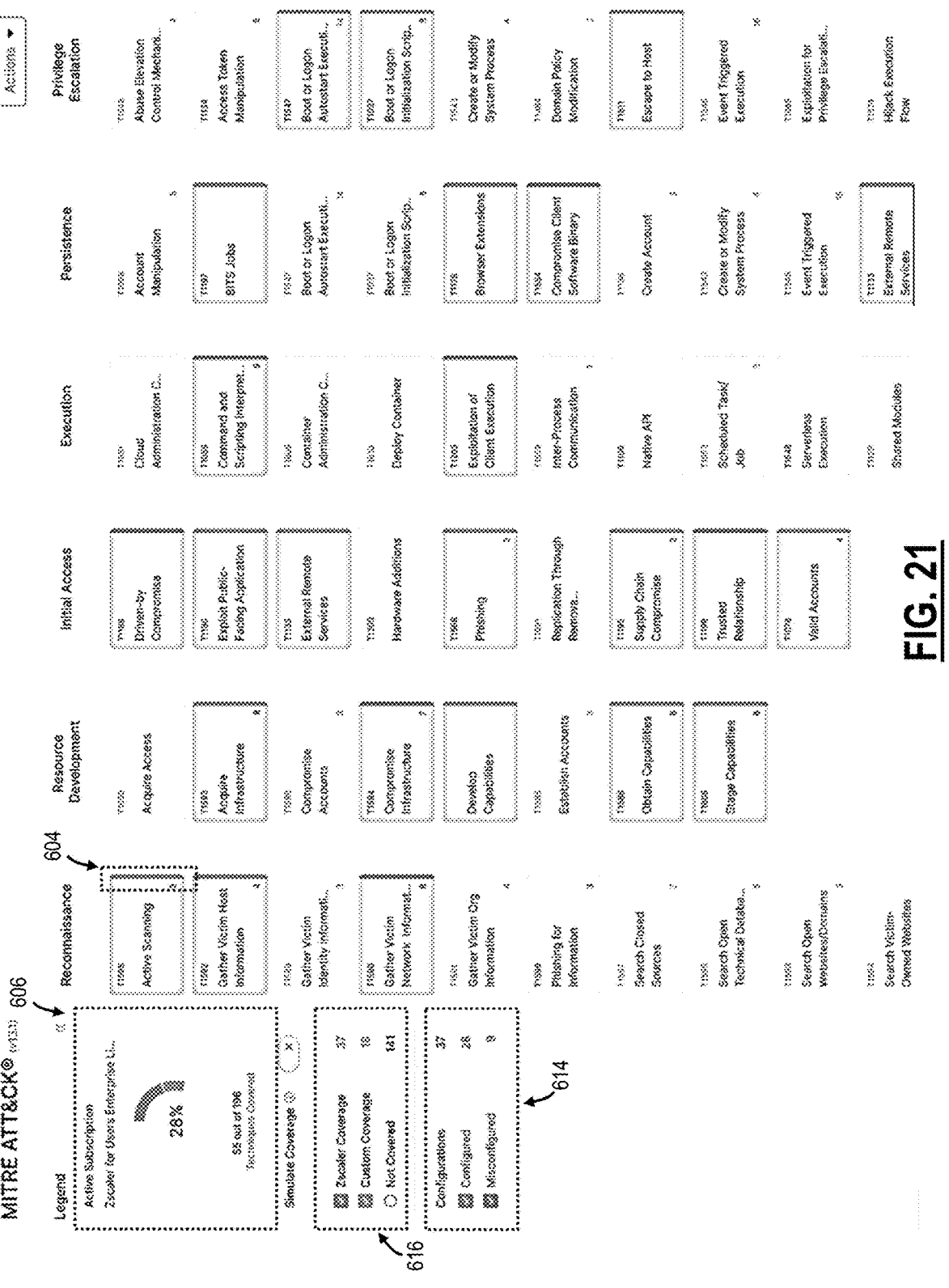
FIG. 21 is an example UI integrating the MITRE ATT&CK framework with customer cybersecurity monitoring data.

By utilizing the MITRE Enterprise Matrix 600, the present systems can provide a UI adapted to integrate the MITRE ATT&CK framework with the risk monitoring processes described herein. In various embodiments, a UI is configured to provide an interactive MITRE ATT&CK interface. FIG. 21 is an example UI integrating the MITRE ATT&CK framework with customer cybersecurity monitoring and licensing data. The UI is adapted to display, via color coded layers, a full picture of the cloud's capabilities via its various security solutions and customer coverage in the customers IT environment. The sequence of tactics, techniques and sub-techniques is preserved within the UI, while covered TTPs for a customer's active subscriptions, custom covered techniques, and 'not covered' techniques are presented in distinct colors. For example, covered TTPs for customers active subscription can be shown in blue, custom covered techniques can be shown in gray, and 'not covered' techniques can be shown in white.

In various embodiments, a configuration status can be shown in the UI. The configuration status can be indicated via red and green lines 604 (color coded indicators), wherein the red and green lines 604 indicate whether security services of the cloud 120 which can cover TTPs are configured correctly or not. For example, a green line on the active scanning TTP indicates that the customer is utilizing a service from the cloud 120 which covers active scanning, and that it is correctly configured. Alternatively, a red line on the active scanning TTP indicates that the customer has not correctly configured the service which covers the active scanning TTP. This helps CISOs and security operators to quickly identify available improvements and prioritize their actions. In this way, customers can maximize the coverage provided by the cloud 120 and reduce the risk in their environment.

Further, the UI shown in FIG. 21 is adapted to display and portray a number and percentage of MITRE ATT&CK techniques which are currently covered within the customers cloud environment. This is shown by the coverage indicator 606 within the UI. In various embodiments, the coverage indicator 606 is further adapted to portray a split between the covered techniques, wherein the split is based on whether the services designed to cover those techniques are configured correctly or not. The coverage indicator can be displayed in the form of a pie chart, as in the example of FIG. 21, or any other form of the like.

Figure 22:
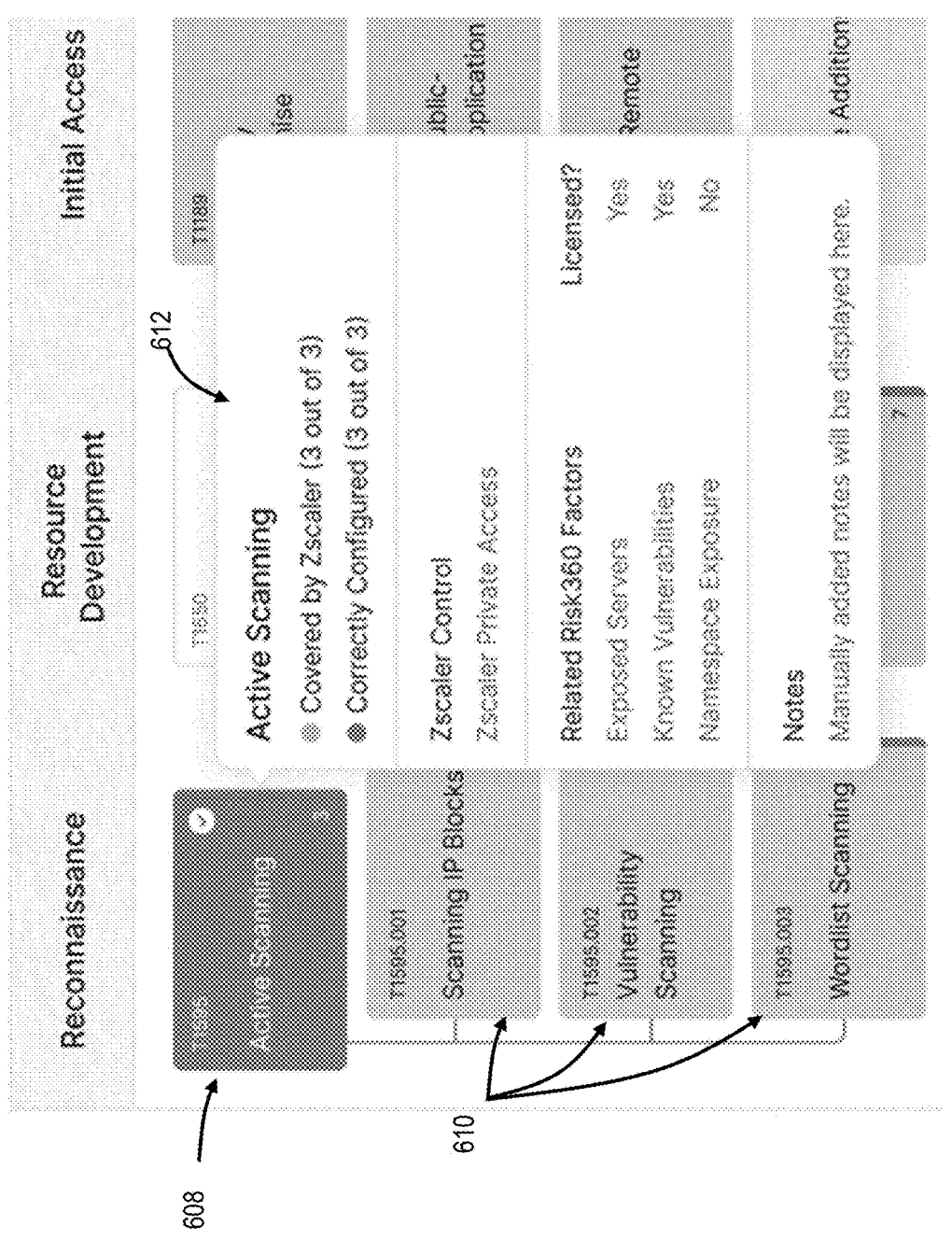
FIG. 22 is a screenshot of the UI mapping TTPs with services and contributing risk factors.

FIG. 22 is a screenshot of the UI mapping TTPs with services and contributing risk factors. The UI can provide a novel view that shows the direct relation between adversary's objectives and security offerings from the cloud 120. That is, the UI provides a novel view that shows the direct relation between potential threats and solutions. Upon selection, each technique 608 expands to display the underlying sub-techniques 610. Selecting a particular sub-technique 610 opens up a side panel 612 with additional details. Connecting a TTP with the contributing factors further streamlines the analysis and remediation process for customers of the cloud 120. These factors are used when calculating an organization's risk score. The UI is adapted to provide mappings between the various sub-techniques and the factors used to generate the risk score. Further, the UI provides information relating to which security service product of the cloud 120 is configured to cover/protect against these techniques and sub-techniques, and whether they are configured.

The side panel 612 is further adapted to show the number of sub-techniques 610 under a technique 608 which are covered by the services of the cloud 120. Further, the side panel is adapted to show if the various services of the cloud 120 are configured correctly for covering the various sub-techniques 610. Again, this can be visualized by colored lines 604 on each of the sub-techniques 610, and by a description within the side panel 612, i.e., "3 out of 3 are correctly configured".

In addition, the side panel 612 can further provide information including the specific service of the cloud 120 which covers the technique 608 and various sub-techniques 610. For example, in FIG. 22, the Active Scanning technique and its various sub-techniques are covered by "Zscaler Private Access". Additionally, when selecting a technique 608 which has coverage available that is not configured correctly, the side panel 612 can provide a remediation procedure for correcting the misconfiguration.

As described, the process herein may include the steps of 1) determining one or more recommendations for changing configuration settings of the one or more network security tools in order to mitigate the risk and increase the effectiveness score and reducing the risk score and 2) displaying the effectiveness score, the risk score, and the one or more recommendations on a dashboard of a user interface of a computing device associated with a network security administrator. That is, the displaying can be via the framework UI described herein, while the determining is based on the available services and whether those services are configured correctly. For example, the systems can recommend correcting one or more configurations in order to increase an organization's security.

Based on MITRE guidelines, the UI can display whether the techniques 608 and sub-techniques 610 fall under the protect, detect, or respond category and whether the scoring value is minimal, partial, or significant along with MITRE descriptions and justifications.

For TTPs that do not have a cloud solution available, the UI gives customers the ability to mark the various TTPs as covered if they have any third party services that cover TTPs which are not covered by services offered by the cloud 120. That is, customers have an option to mark their non-cloud coverages (custom coverages), if any. This will lead to a holistic coverage view with all cloud 120 and third party services visualized in a single interface. That is, the UI provides an interactive MITRE framework showing all covered TTPs whether they are covered by the cloud 120 or any third party services. The UI shown in FIG. 21 can be further adapted to show the number of techniques which fall under cloud covered, custom covered, and not covered in a holistic coverage listing 616. Further, to provide more insight, in addition to indicating via the various lines 604 on each of the techniques 608 and sub-techniques 610, the configuration status of each service covering the various techniques 608 can be described in a holistic configuration listing 614, indicating the number of configured services and misconfigured services.

The UI can be further adapted to show, responsive to selection of a technique 608 or sub-technique 610, the specific risk area to which it is associated with. That is, the UI is adapted to map each TTP to the areas of Prevent Compromise (PC), Data Loss (DL), Lateral Movement (LM), and Asset Exposure (AE). This information, in combination with the coverage data, can be used to further describe and visualize the risk score to customers.

For the service licenses offered by the cloud 120 that are not yet purchased by the customer, the systems allow a simulated coverage view to clearly show what additional coverage they will be able to secure if they subscribe to those remaining services. That is, the UI can show what sort of coverage a customer's environment can have if they were to subscribe to, and configure correctly, all security offerings provided by the cloud 120. Again, this is provided via the interactive MITRE ATT&CK UI to show specific TTPs which are and can be covered in a customer's environment. As described in previous sections, the present UI can be adapted to visualize a customers risk score. In various embodiments, the systems can display a hypothetical risk score of a customer if they were to configure all of their available coverages correctly. Further, in various embodiments, by selecting an actions button within the UI, the UI allows customers to download the full coverage view in either pdf or png format, and share quickly with other team members.

§ 6.1 Process for Visualizing MITRE-Based Security Coverage

FIG. 23 is a flowchart of a process 700 for visualizing MITRE-based security coverage. The process 700 includes obtaining cybersecurity monitoring data for an organization where the cybersecurity monitoring data is from a plurality of sources including from cybersecurity monitoring of a cloud environment associated with the organization (step 702); providing an interactive User Interface (UI), wherein the UI overlays a catalog of known malicious tactics with the cybersecurity monitoring data (step 704); and responsive to one or more selections within the UI, providing information related to coverage of one or more threat techniques (step 706).

The process 700 can further include wherein the cybersecurity monitoring data includes license information associated with security services configured within the organizations cloud environment. The catalog of known malicious tactics can include MITRE Adversarial Tactics, Techniques, and Common Knowledge (ATT&CK) framework, wherein the cybersecurity monitoring data is overlayed thereon. The UI can be adapted to display a percentage of MITRE ATT&CK techniques which are covered within the organization's cloud environment. Each technique associated with the MITRE ATT&CK framework can be color coded based on whether it is covered by one or more security services. The color coding can be based on whether each technique is covered by a security service associated with the cloud, covered by a third party service, or not covered. Each technique associated with the MITRE ATT&CK framework can include a color coded indicator based on whether an associated security service is configured correctly. Each sub-technique associated with a technique can include a color coded indicator based on whether an associated security service is configured correctly. The information related to coverage of one or more threat techniques can include a remediation procedure for correcting a misconfigured security service associated with the one or more threat techniques. The catalog of known malicious tactics can include NIST cybersecurity framework, and wherein the cybersecurity monitoring data is overlayed thereon.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, circuits, etc. described herein contemplate use in any and all combinations with one another, including individually as well as combinations of less than all of the various elements, operations, steps, methods, processes, algorithms, functions, techniques, circuits, etc.

What is claimed is:

1. A method comprising steps of:

obtaining cybersecurity monitoring data for an organization where the cybersecurity monitoring data is from a plurality of sources including from cybersecurity monitoring of a cloud environment associated with the organization;

providing an interactive User Interface (UI), wherein the UI overlays a catalog of known malicious tactics with the cybersecurity monitoring data, wherein the catalog of known malicious tactics includes MITRE Adversarial Tactics, Techniques, and Common Knowledge (ATT&CK) framework, and wherein the cybersecurity monitoring data is overlayed thereon; and responsive to one or more selections within the UI, providing information related to coverage of one or more threat techniques.

2. The method of claim 1, wherein the cybersecurity monitoring data includes license information associated with security services configured within the organizations cloud environment.

3. The method of claim 1, wherein the UI is adapted to display a percentage of MITRE ATT&CK techniques which are covered within the organization's cloud environment.

4. The method of claim 1, wherein each technique associated with the MITRE ATT&CK framework is color coded based on whether it is covered by one or more security services.

5. The method of claim 4, wherein the color coding is based on whether each technique is covered by a security service associated with the cloud, covered by a third party service, or not covered.

6. The method of claim 1, wherein each technique associated with the MITRE ATT&CK framework includes a color coded indicator based on whether an associated security service is configured correctly.

7. The method of claim 6, wherein each sub-technique associated with a technique includes a color coded indicator based on whether an associated security service is configured correctly.

8. The method of claim 1, wherein the information related to coverage of one or more threat techniques includes a remediation procedure for correcting a misconfigured security service associated with the one or more threat techniques.

9. The method of claim 1, wherein the catalog of known malicious tactics includes NIST cybersecurity framework, and wherein the cybersecurity monitoring data is overlayed thereon.

\* \* \* \* \*